United States Patent
Xue et al.

(10) Patent No.: US 9,246,724 B2
(45) Date of Patent: Jan. 26, 2016

(54) METHOD AND APPARATUS FOR PERFORMING SOFT DEMAPPING IN ROTATED QUADRATURE AMPLITUDE MODULATION (QAM) BASED COMMUNICATION SYSTEM

(71) Applicant: Samsung Electronics Co., Ltd., Suwon-si (KR)

(72) Inventors: Peng Xue, Hwaseong-si (KR); Kyeong Yeon Kim, Hwaseong-si (KR); Ki Taek Bae, Hwaseong-si (KR); Navneet Basutkar, Yongin-si (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/200,739

(22) Filed: Mar. 7, 2014

(65) Prior Publication Data
US 2014/0270014 A1    Sep. 18, 2014

(30) Foreign Application Priority Data

Mar. 15, 2013    (KR) .................. 10-2013-0027779
Nov. 28, 2013    (KR) .................. 10-2013-0146507

(51) Int. Cl.
| | | |
|---|---|---|
| *H03D 3/22* | (2006.01) | |
| *H04L 27/22* | (2006.01) | |
| *H04L 27/06* | (2006.01) | |
| *H04L 25/06* | (2006.01) | |
| *H04L 27/38* | (2006.01) | |
| *H04L 27/34* | (2006.01) | |

(52) U.S. Cl.
CPC .............. *H04L 27/06* (2013.01); *H04L 25/067* (2013.01); *H04L 27/3444* (2013.01); *H04L 27/38* (2013.01)

(58) Field of Classification Search
CPC . H04L 27/06; H04L 25/067; H04L 25/03318; H04L 1/006
USPC ......................................... 375/332, 331, 333
See application file for complete search history.

(56) References Cited

U.S. PATENT DOCUMENTS

| | | | | |
|---|---|---|---|---|
| 7,349,496 | B2 * | 3/2008 | Jia et al. .......................... | 375/341 |
| 8,693,588 | B2 * | 4/2014 | McCloud et al. .............. | 375/341 |
| 2011/0261908 | A1 * | 10/2011 | Chiang et al. ................. | 375/341 |
| 2012/0250805 | A1 | 10/2012 | Shin | |
| 2014/0270012 | A1 * | 9/2014 | Sagi .............................. | 375/341 |

OTHER PUBLICATIONS

Li, Meng, et al. "Design of rotated QAM mapper/demapper for the DVB-T2 standard." Signal Processing Systems, 2009. SiPS 2009. IEEE Workshop on. IEEE, 2009.

Pérez-Calderón, D., et al. "Rotated constellation demapper for DVB-T2." Electronics Letters 47.1 (2011):31-32.

(Continued)

*Primary Examiner* — Qutbuddin Ghulamali
(74) *Attorney, Agent, or Firm* — NSIP Law

(57) ABSTRACT

A soft demapping apparatus and method thereof includes a pre-processing unit to pre-process a reception signal obtained from a symbol representing bits. A candidate selection unit selects two candidates from among constellation points included in a constellation for each of the bits. A distance calculation unit calculates a Euclidean distance between the reception signal and the two candidates. A log-likelihood ratio (LLR) calculation unit calculates an LLR with respect to the bits based on the Euclidean distance between the reception signal and the two candidates.

35 Claims, 19 Drawing Sheets

(56) References Cited

OTHER PUBLICATIONS

"Implementation guidelines for a second generation digital terrestrial television broadcasting system" European Telecommunications Standards Institute TS 102 831 V1.2.1, 2012.

Li, Min, et al. "A Geometrical Approach for Highly Efficient Soft Demodulation of Rotated Constellations." Signal Processing Systems (SiPS), 2012 IEEE Workshop on. IEEE, 2012.

Kim, Kyeongyeon, et al. "One-dimensional soft-demapping using decorrelation with interference cancellation for rotated QAM constellations." Consumer Communications and Networking Conference (CCNC), 2012 IEEE. IEEE, 2012.

Extended European Search Report issued Aug. 19, 2014 in counterpart European Application No. EP 14160017.1 (7 pages).

* cited by examiner (1) $b_0=0$ (2,3), $b_0=1$ (3,2)    (2) $b_2=0$ (3,1), $b_2=1$ (3,2)

(3) $b_1=0$ (2,3), $b_1=1$ (3,2)    (4) $b_3=0$ (4,2), $b_3=1$ (3,2)

(1) Odd-numbered bits  (2) Even-numbered bits

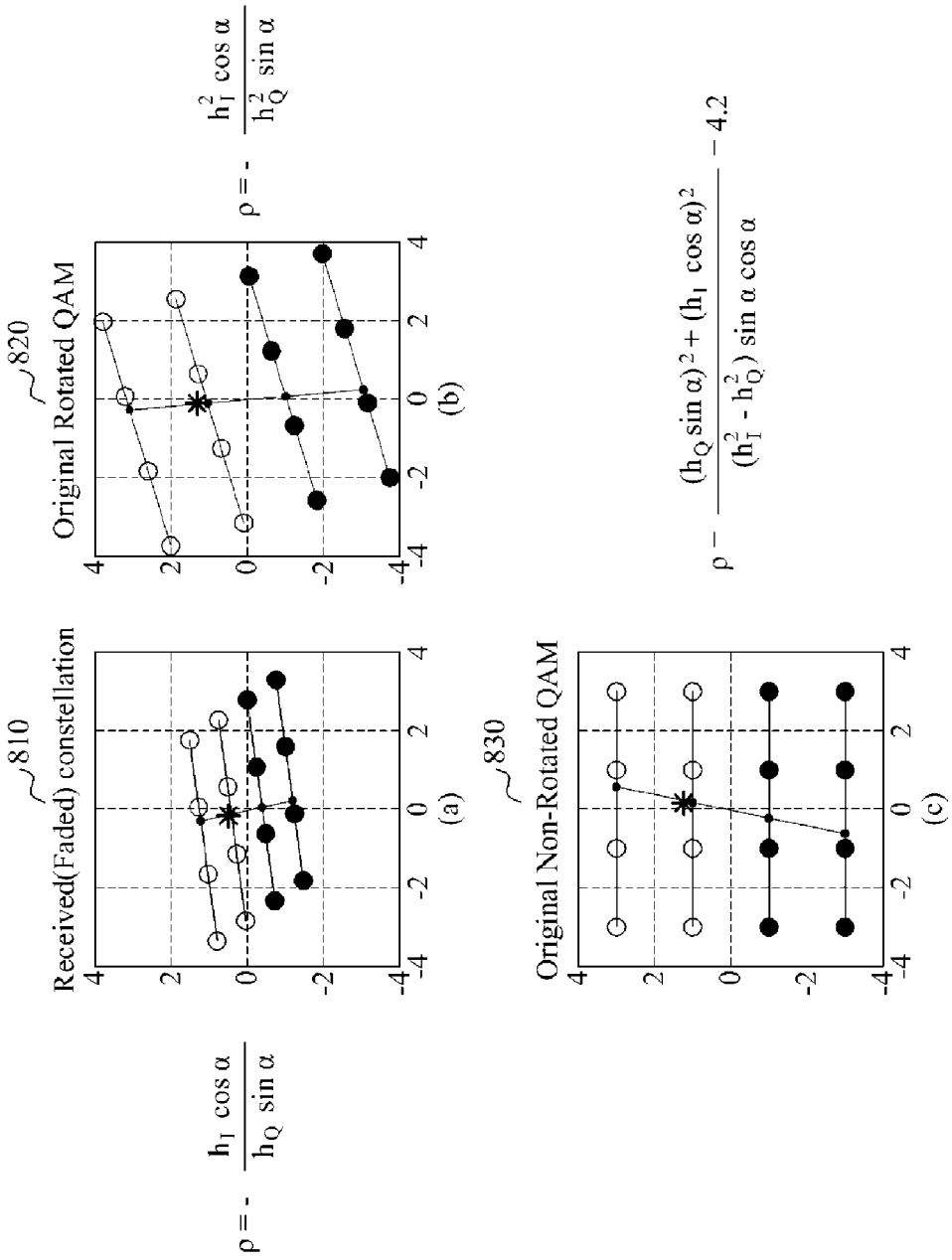

METHOD AND APPARATUS FOR PERFORMING SOFT DEMAPPING IN ROTATED QUADRATURE AMPLITUDE MODULATION (QAM) BASED COMMUNICATION SYSTEM

CROSS-REFERENCE TO RELATED APPLICATIONS

This application claims the benefit under 35 USC 119(a) of Korean Patent Application No. 10-2013-0027779, filed on Mar. 15, 2013, and Korean Patent Application No. 10-2013-0146507, filed on Nov. 28, 2013, in the Korean Intellectual Property Office, the entire disclosures of which are incorporated herein by reference for all purposes.

BACKGROUND

1. Field

The following description relates to a rotated quadrature amplitude modulation (QAM) based communication system, and more particularly, to a method and an apparatus to perform a soft demapping on a received symbol in a rotated QAM based communication system.

2. Description of Related Art

A wireless communication system and a broadcasting system may use a rotated quadrature amplitude modulation (QAM) transmission technology. For example, a digital video broadcasting (DVB) standard, for example, a digital video broadcasting-second generation terrestrial (DVB-T2) standard, prescribes that data be transmitted based on the rotated QAM.

Fading may occur in a wireless channel of a wireless communication system. Here, the fading refers to attenuation of a wireless signal during transmission of the wireless signal. To combat fading problems, a diversity method may be employed, which includes spatial diversity and frequency diversity. A signal-space diversity method is being adopted by a great number of technologies, including the DVB-T2 standard, to address fading problems. As an example, a rotated QAM constellation may be used to implement the signal-space diversity method. However, when a transmitter uses the rotated QAM, a receiver would have to execute a complex process to perform a soft demapping.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a method to perform a soft demapping, the method includes receiving a reception signal from a symbol representing bits; selecting two candidates from among constellation points in a constellation for each of the bits; and calculating a log-likelihood ratio (LLR) for each of the bits based on an Euclidean distance between the reception signal and the two candidates.

The apparatus may also include detecting the bits using the LLR for each of the bits.

The selecting of the two candidates may include selecting one candidate at an instance in which each of the bits is a first logic value, and selecting one alternative candidate at an instance in which each of the bits is a second logic value.

The selecting of the two candidates may include selecting a candidate, for each of lines, from among the constellation points included in the lines including a $\sqrt{M}$ number of constellation points in response to the symbol corresponding to an M-quadrature amplitude modulation (QAM) symbol, where "$M$"=$2^n$ and "n" is an integer greater than two.

The constellation points in the lines may correspond to a logic value of a corresponding bit.

The apparatus may also include storing, in a lookup table (LUT), the Euclidean distance between the reception signal and the two candidates and each index of the two candidates of a bit.

The calculating of the LLR may include calculating the LLR of an alternative bit using the Euclidean distance between the reception signal and the two candidates and each index of the two candidates of the bit stored in the LUT.

The apparatus may also include rotating, in a reverse direction, a constellation of the reception signal to provide the constellation as a vertical parallel or a horizontal parallel.

In accordance with an illustrative configuration, there is provided a non-transitory computer-readable storage medium including a program with instructions to cause a computer to perform the method described above.

In accordance with an illustrative configuration, there is provided an apparatus to perform a soft demapping, the apparatus includes a pre-processing unit configured to pre-process a reception signal from a symbol representing bits; a candidate selection unit configured to select two candidates from among constellation points in a constellation for each of the bits; and a log-likelihood ratio (LLR) calculation unit configured to calculate an LLR for each of the bits based on an Euclidean distance between the reception signal and the two candidates.

The apparatus may also include a distance calculation unit configured to calculate the Euclidean distance between the reception signal and the two candidates.

The apparatus may also include a final full LLR calculation unit configured to calculate a final full LLR to detect the bits using the LLR for each of the bits.

The candidate selection unit may be configured to select one candidate at an instance in which each of the bits is a first logic value, and select one alternative candidate at an instance in which each of the bits is a second logic value.

The candidate selection unit may be configured to select a candidate, for each of lines, from among the constellation points included in the lines including a $\sqrt{M}$ number of constellation points in response to the symbol corresponding to an M-quadrature amplitude modulation (QAM) symbol, where "$M$"=$2^n$ and "n" is an integer greater than two.

The apparatus may also include a lookup table (LUT) configured to store the Euclidean distance between the reception signal and the two candidates and each index of the two candidates of a bit. The LLR calculation unit may be configured to calculate the LLR of an alternative bit using the Euclidean distance between the reception signal and the two candidates and each index of the two candidates of the bit stored in the LUT.

The apparatus may also include a rotating unit configured to rotate, in a reverse direction, a constellation of the reception signal to provide the constellation as a vertical parallel or a horizontal parallel.

In accordance with an illustrative configuration, there is provided a method to perform a soft demapping, the method includes selecting a candidate constellation point from a reception signal for each of lines formed by constellation points in a constellation for a bit from among bits in a symbol to be used for data transmission; and calculating a log-likelihood ratio (LLR) of the bit based on the reception signal and the selected candidate constellation points.

In response to the symbol corresponding to an M-quadrature amplitude modulation (QAM) symbol, a number of the selected candidate constellation points may be $\sqrt{M}$, where "M"=$2^n$ and "n" is an integer greater than two.

The symbol may correspond to a rotated QAM symbol to which a Q delay is applied, and the constellation for the bit corresponds to a constellation in which channel information of an I channel and channel information of a delayed Q channel are reflected.

The calculating of the LLR of the bit may include calculating distances between the reception signal and the selected candidate constellation points; and calculating the LLR of the bit based on the calculated distances.

The lines may include a line corresponding to a first logic value of the bit, and a line corresponding to second logic value of the bit.

In response to the symbol corresponding to the M-QAM symbol, each of the lines may be formed by a $\sqrt{M}$ number of constellation points, where "M"=$2^n$ and "n" is an integer greater than two.

In accordance with an illustrative configuration, there is provided a non-transitory computer-readable storage medium including a program includes instructions to cause a computer to perform the method described above.

In accordance with another illustrative configuration, there is provided a method to perform a soft demapping, the method including selecting from a reception signal a $\sqrt{M}$ number of candidate constellation points in a constellation for a bit from among bits included in an M-quadrature amplitude modulation (QAM) symbol, where "M"=$2^n$ and "n" is an integer greater than two; and calculating a log-likelihood ratio (LLR) of the bit based on the reception signal and the selected candidate constellation points.

The calculating of the LLR of the bit may include calculating distances between the reception signal and the selected $\sqrt{M}$ number of candidate constellation points; and calculating the LLR of the bit based on the calculated $\sqrt{M}$ number of distances.

The symbol may correspond to a rotated QAM symbol to which a Q delay is applied, and the constellation for the bit corresponds to a constellation in which channel information of an I channel and channel information of a delayed Q channel are reflected.

In accordance with an illustrative configuration, there is provided a non-transitory computer-readable storage medium including a program includes instructions to cause a computer to perform the method described above.

In accordance with an illustrative configuration, there is provided an apparatus to perform a soft demapping, the apparatus includes a selection unit configured to select from a reception signal a $\sqrt{M}$ number of candidate constellation points in a constellation for a bit from among bits included in an M-quadrature amplitude modulation (QAM) symbol, where "M"=$2^n$ and "n" is an integer greater than two; and a calculation unit configured to calculate a log-likelihood ratio (LLR) of the bit based on the reception signal and the selected candidate constellation points.

In accordance with another illustrative configuration, there is provided an apparatus to perform a soft demapping, the apparatus includes a selection unit configured to select a candidate constellation point for each of lines formed by constellation points in a constellation for a bit from among bits included in a symbol to be used for data transmission, based on a reception signal; and a calculation unit configured to calculate a log-likelihood ratio (LLR) of the bit based on the reception signal and the selected candidate constellation points.

In response to the bit being an even-numbered bit, the calculation unit may be configured to calculate an LLR of an alternative even-numbered bit using the candidate constellation points selected of the bit, and in response to the bit being an odd-numbered bit, the calculation unit may be configured to calculate an LLR of an alternative odd-numbered bit using the candidate constellation points selected of the bit.

The calculation unit may be configured to calculate distances between the reception signal and the selected candidate constellation points, and calculate the LLR of the bit based on the calculated distances.

In response to the symbol corresponding to an M-QAM symbol, where "M"=$2^n$ and "n" is an integer greater than two, a number of the selected candidate constellation points may be $\sqrt{M}$.

The symbol may correspond to a rotated QAM symbol to which a Q delay is applied, and a constellation for the bit corresponds to a constellation in which channel information of an I channel and channel information of a delayed Q channel are reflected.

The apparatus may also include a gradient calculation unit configured to calculate a gradient of a reference line in a constellation for a single bit based on a rotation angle of a constellation and a channel state.

A full LLR calculation unit may be configured to calculate a full LLR using LLRs of the bits to detect the bits.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIGS. 8A and 8B are diagrams illustrating examples of a method of calculating a gradient of a reference line in a constellation for even-numbered bits from among a plurality of bits included in a symbol, in accord with an embodiment.

Figure 1A:
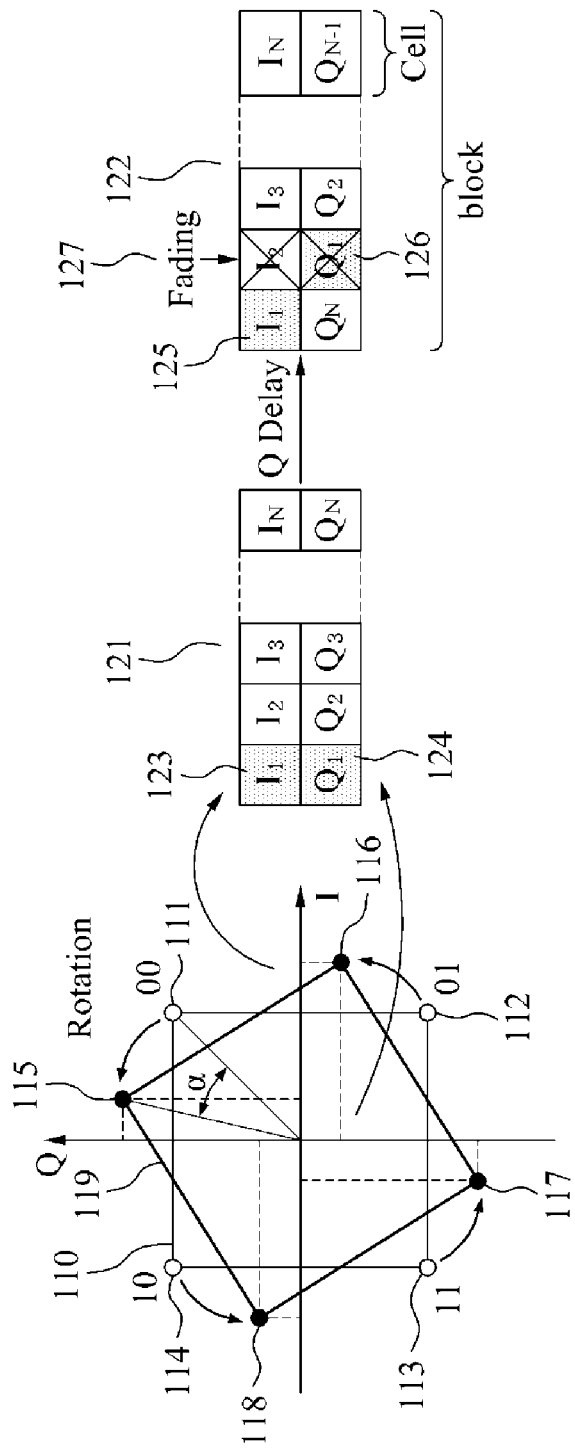
FIG. 1A is a diagram illustrating an example of rotated quadrature amplitude modulation (QAM) to which a Q delay is applied, in accord with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1A illustrates an example of rotated quadrature amplitude modulation (QAM) to which a Q delay is applied, in accord with an embodiment. In general, 4-QAM includes constellation points 111, 112, 113, and 114 disposed in a square-shaped constellation 110 having identical Q channel intervals and identical I channel intervals. Each of the constellation points 111, 112, 113, and 114 corresponds to a plurality of bits. For example, the constellation point 111 corresponds to "00", the constellation point 112 corresponds to "01", the constellation point 113 corresponds to "11", and the constellation point 114 corresponds to "10.

When an "n" number of bits $\{b_0, b_1, b_2, \ldots, b_{n-1}\}$, "n" being an integer greater than two, is assumed to be mapped to an M-QAM symbol (M=$2^n$), the M-QAM symbol is represented by $s=s_I+js_Q$, where "s" denotes an M-QAM symbol, "$s_I$" denotes a signal of an I channel, "$s_Q$" denotes a signal of a Q channel, and "j" denotes an operator representing an imaginary number portion. In the following descriptions, unless otherwise indicated, a "QAM symbol" includes, for example, a QAM symbol, a 16-QAM symbol, a 32-QAM symbol, a 64-QAM symbol, or other types of general M-QAM symbols.

Rotated 4-QAM uses a rotated constellation 119 obtained through the constellation 110 being rotated by a predetermined angle "α". The rotated constellation 119 includes constellation points 115, 116, 117, and 118 rotated by the predetermined angle "α". Each of the rotated constellation points 115, 116, 117, and 118 corresponds to a plurality of bits. For example, the constellation point 115 corresponds to "00", the constellation point 116 corresponds to "01", the constellation point 117 corresponds to "11", and the constellation point 118 corresponds to "10. When a rotated QAM symbol is generated using a rotation angle α, the rotated QAM symbol is defined by Equation 1.

$$\tilde{s} = e^{j\alpha}s = \tilde{s}_I + j\tilde{s}_Q \qquad \text{[Equation 1]}$$
$$= (s_I\cos\alpha - s_Q\sin\alpha) + j(s_I\sin\alpha + s_Q\cos\alpha)$$

In Equation 1, $\tilde{s}$ denotes a rotated QAM symbol, $e^{j\alpha}$ denotes a rotation operator, $\tilde{s}_I$ denotes a rotated signal obtained through an I channel signal being rotated by a rotation angle α, and $\tilde{s}_Q$ denotes a rotated signal obtained through a Q channel signal being rotated by the rotation angle α.

A processor receives a reception signal from the rotated QAM symbol transmitted from a transmitter. The processor performs an orthogonal frequency-division multiplexing (OFDM) demodulation to detect a plurality of bits from the reception signal. For example, the processor collects a real number portion from a sub-carrier corresponding to an I channel, and collects an imaginary number portion from a sub-carrier corresponding to a Q channel. The reception signal is expressed by Equation 2 using the real number portion and the imaginary number portion collected at the processor from the two corresponding sub-carriers.

$$r = r_I + jr_Q = h_I\tilde{s}_I + jh_Q\tilde{s}_Q + w \qquad \text{[Equation 2]}$$

In Equation 2, "r" denotes a reception signal, "$r_I$" denotes a reception signal of an I channel, "$r_Q$" denotes a reception signal of a Q channel, $h_I$ denotes channel information of a sub-carrier corresponding to an I channel, $h_Q$ denotes channel information of a sub-carrier corresponding to a Q channel, and "w" denotes noise. Each channel information refers to an amplitude of a channel.

In general, the I channel signal of a real number portion and the Q channel signal of an imaginary number portion included in the QAM symbol are transmitted through an identical carrier, having a phase difference of 90 degrees. For example, I and Q components of a rotated QAM symbol are indicated as a block 121. Each column included in the block 121 indicates a single carrier. When a Q delay is not applied, a real number portion "$I_1$" 123 and an imaginary number portion "$Q_1$" 124 of a rotated QAM symbol "$s_1$" are mapped to an identical sub-carrier in OFDM.

A Q delay is introduced to a rotated QAM to obtain an additional diversity. The Q delay refers to a method of mapping an I channel signal of a real number portion and a Q channel signal of an imaginary number portion included in an identical QAM symbol to differing carriers. When the Q delay is introduced to the rotated QAM, a component-axes interleaving may be performed. When the Q delay is introduced to the rotated QAM symbol, the real number portion and the imaginary number portion of the rotated QAM symbol are mapped and transmitted to a plurality of differing sub-carriers in OFDM. For example, I and Q components of the rotated QAM symbol to which the Q delay is introduced are indicated as block 122. When the Q delay is introduced, a real number portion "$I_1$" 125 and an imaginary number portion "$Q_1$" 126 of the rotated QAM symbol "$s_1$" are mapped to the plurality of differing sub-carriers in OFDM, respectively.

A cyclic Q delay may be introduced in a forward error correction (FEC) block unit. As illustrated in block 122, a final Q channel signal "$Q_N$" and a first I channel signal "$I_1$" in the block are mapped to an identical carrier through the cyclic Q delay.

When the component-axes interleaving is performed by introducing the Q delay, the processor restores a signal of a fading cell from a signal of a different cell. The fading cell is a predetermined cell in which the signal is not received because of fading. In one example, a single cell corresponds to a single OFDM sub-carrier. When the component-axes interleaving is performed by introducing the Q delay, a probability of the processor not receiving both "$I_1$" 125 and "$Q_1$" 126 is significantly low because a probability of fading occurring in a cell, to which "$I_1$" 125 is mapped, and a cell, to which "$Q_1$" 126 is mapped, is relatively lower than a probability of fading occurring in the cell, to which "$I_1$" 125 is mapped, and the cell, to which "$Q_1$" 126 is mapped. Accordingly, when one of a real number portion signal and an imaginary number portion signal of a predetermined rotated QAM symbol is not received due to fading, the processor restores an un-reception signal using the other of the two signals. For example, when "$Q_1$" 126 is not received due to fading 127, the receiver restores "$Q_1$" 126 using $I_1$" 125.

Figure 1B:
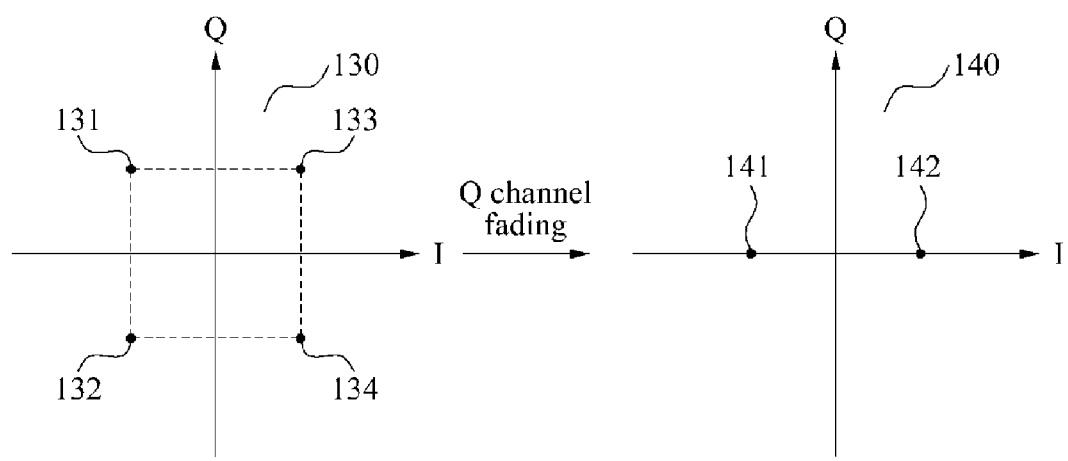
FIGS. 1B and 1C are diagrams illustrating a diversity gain generated when a rotated QAM symbol having a Q delay is used, in accord with an embodiment.
Figure 1C:
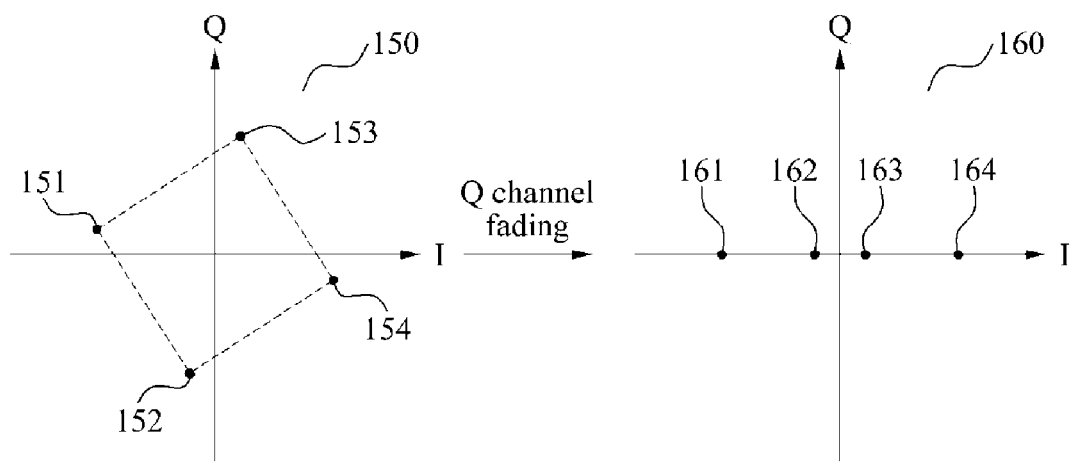

FIGS. 1B and 1C illustrate examples of an instance in which a diversity gain is generated when a rotated QAM symbol having a Q delay is used, compared to an instance in which a general QAM symbol is used. Referring to FIG. 1B, a transmitter transmits a symbol corresponding to one of constellation points 131, 132, 133, and 134 included in a constellation 130 when a general QAM symbol is used. For example, the transmitter transmits a symbol corresponding to the constellation point 131 to transmit two bits, for example, "10". Alternatively, the transmitter transmits a symbol corresponding to the constellation point 132 to transmit two bits, for example, "11". In response to fading occurring in a Q channel, it is difficult for a processor to determine whether a symbol transmitted from the transmitter is the symbol corresponding to the constellation point 131 or the symbol corresponding to the constellation point 132 because the symbol corresponding to the constellation point 131 and the symbol corresponding to the constellation point 132 are distinguished by the Q channel.

Referring to FIG. 1C, the transmitter transmits a symbol corresponding to one of constellation points 151, 152, 153, and 154 included in a constellation 150 when a rotated QAM symbol is used. As an alternative to an instance in which the general QAM symbol is used, regardless of fading occurring in the Q channel, the processor restores a symbol transmitted from the transmitter using the rotated QAM symbol. For example, regardless of fading occurring in the Q channel, when a symbol corresponding to the constellation point 151 is transmitted, the processor receives a reception signal corresponding to a constellation point 161. In response to the reception signal corresponding to the constellation point 161, the processor determines a symbol transmitted from the transmitter to be the symbol corresponding to the constellation point 151. In response to the transmitter transmitting a symbol corresponding to the constellation point 152, the processor receives a reception signal corresponding to a constellation point 162 despite of fading in the Q channel. The processor determines a symbol transmitted from the transmitter to be the symbol corresponding to the constellation point 152 when the reception signal corresponding to the constellation point 162 is received. As such, a diversity gain is generated when the rotated QAM symbol is used, compared to the instance in which the general QAM symbol is used.

Figure 2A:
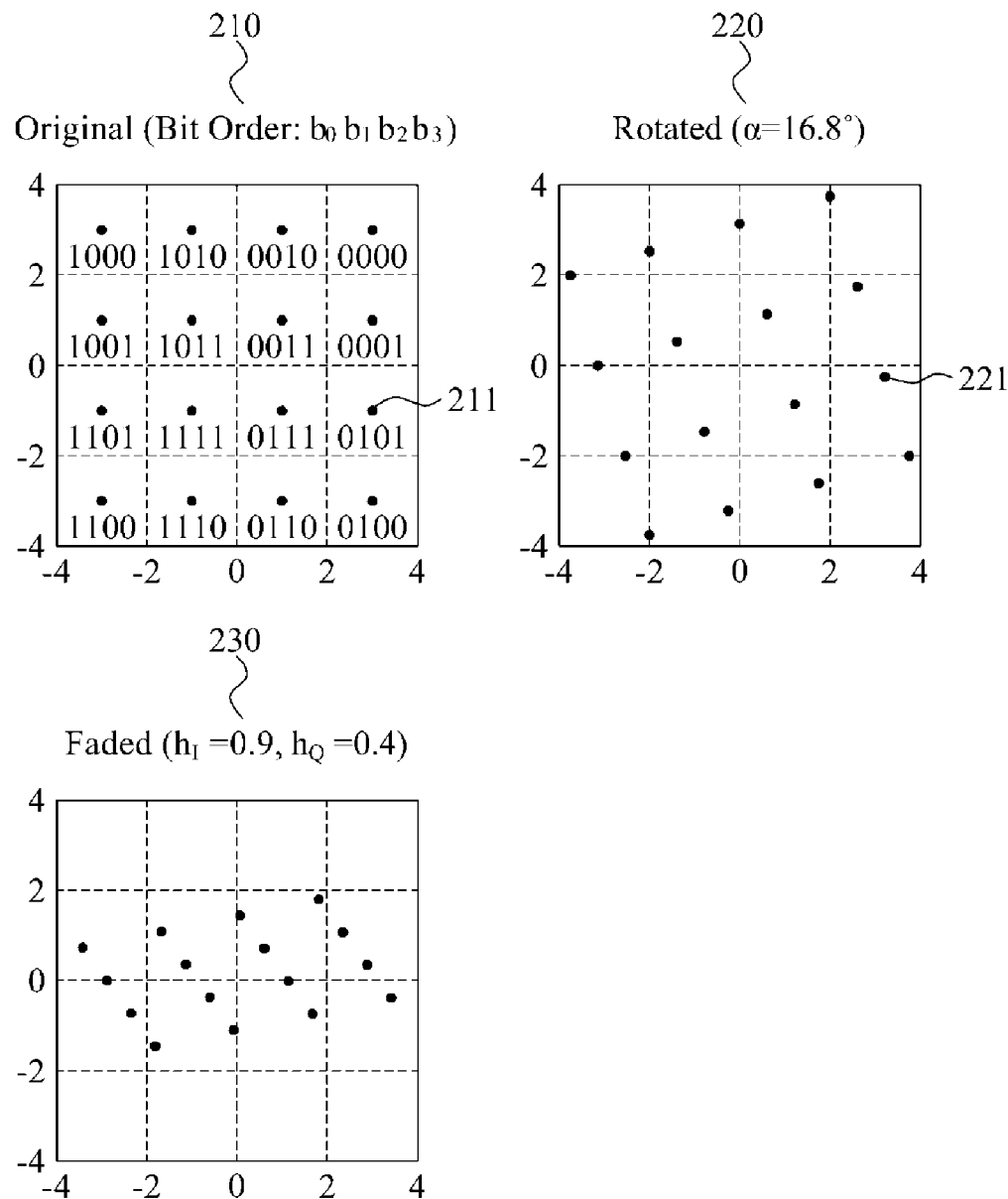
FIG. 2A is a diagram illustrating an example of an original 16 QAM, a rotated 16 QAM, and a faded 16 QAM, in accord with an embodiment.

FIG. 2A illustrates an example of an original 16 QAM, a rotated 16 QAM, and a faded 16 QAM, in accordance with an embodiment. Hereinafter, for conciseness and ease of description, an example of 16 QAM is used; however, various details pertaining to description of 16 QAM may be applied, for example, to 64 QAM or 256 QAM, and a non-squared 32 QAM or 128 QAM.

Referring to FIG. 2A, an original 16 QAM constellation 210 includes 16 constellation points. A bit order of the original 16 QAM constellation 210 is assumed to be $b_0$-$b_1$-$b_2$-$b_3$. The bit order of the original 16 QAM constellation 210 may be in a different order. An index, for example, "1" or "3", of even-numbered bits, for example, $b_1$ or $b_3$, corresponds to an odd number. An index, for example, "0" or "2", of odd-numbered bits, for example, $b_0$ or $b_2$, corresponds to an even number from among a plurality of bits included in a symbol. Each of the 16 constellation points included in the original 16 QAM constellation 210 includes information represented in four bits. For example, each of the 16 constellation points corresponds from "0000" to "1111". Each of the 16 constellation points corresponds to one from "0000" to "1111" based on a position disposed at the original 16 QAM constellation 210. For one example, based on Gray coding, bits, from "0000" to "1111", corresponding to adjacent constellation points on the original 16 QAM constellation 210, are allocated to the 16 constellation points, respectively, to allow a single digit difference in a four-digit bit value. Bit information illustrated in FIG. 2A is merely exemplary, and may be modified to various forms.

When the original 16 QAM constellation 210 is rotated by a rotation angle "α", a rotated 16 QAM constellation 220 is obtained. A transmitter transmits data using 16 constellation points included in the rotated 16 QAM constellation 220. For example, the transmitter transmits a symbol corresponding to a constellation point 221 in order to transmit "0101". The constellation point 221 corresponds to a rotated constellation point obtained through the constellation point 211 corresponding to "0101", being rotated by the rotation angle "α" from the original 16 QAM constellation 210.

When the rotated 16 QAM constellation 220 is faded in an I channel and/or a Q channel, a faded rotated 16 QAM constellation 230 is obtained. When a rotated 16 QAM to which a Q delay is introduced is used, a degree of the I channel differs from a degree of the Q channel being faded. In one example, the faded rotated 16 QAM constellation 230 is a constellation of an instance in which a size "$h_I$" of the I channel is "0.9", and a size "$h_Q$" of the Q channel is "0.4". Constellation points of the faded rotated 16 QAM constellation 230 are disposed by being scaled down by a degree of "0.9" in an x axis direction corresponding to the I channel because the size $h_I$" of the I channel of the faded rotated 16 QAM constellation 230 is "0.9", when compared to constellation points of the rotated 16 QAM constellation 220. Constellation points of the faded rotated 16 QAM constellation 230 are disposed by being scaled down by a degree of "0.4" in an y axis direction corresponding to the Q channel because the size $h_Q$" of the Q channel of the faded rotated 16 QAM constellation 230 is "0.4", when compared to constellation points of the rotated 16 QAM constellation 220. Accordingly, the faded rotated 16 QAM constellation 230 is no longer provided in a regular shape.

The rotated 16 QAM constellation 220 may be a constellation used in the transmitter, and the faded rotated 16 QAM constellation 230 may be a constellation used in the processor or a receiver. For example, when a rotated 16 QAM symbol generated based on the rotated 16 QAM constellation 220 undergoes fading while being transmitted, the processor restores a reception signal based on the faded rotated 16 QAM constellation 230.

An apparatus to perform a soft demapping, hereinafter also referred to as a soft demapping apparatus, may be used to estimate bit information from a reception signal. The soft demapping apparatus generates information to be used for decoding a plurality of bits transmitted from the transmitter from the reception signal. For example, the soft demapping apparatus calculates a log-likelihood ratio (LLR) for the plurality of bits using the reception signal. The LLR for the plurality of bits is used to decode the plurality of bits.

Figure 2B:
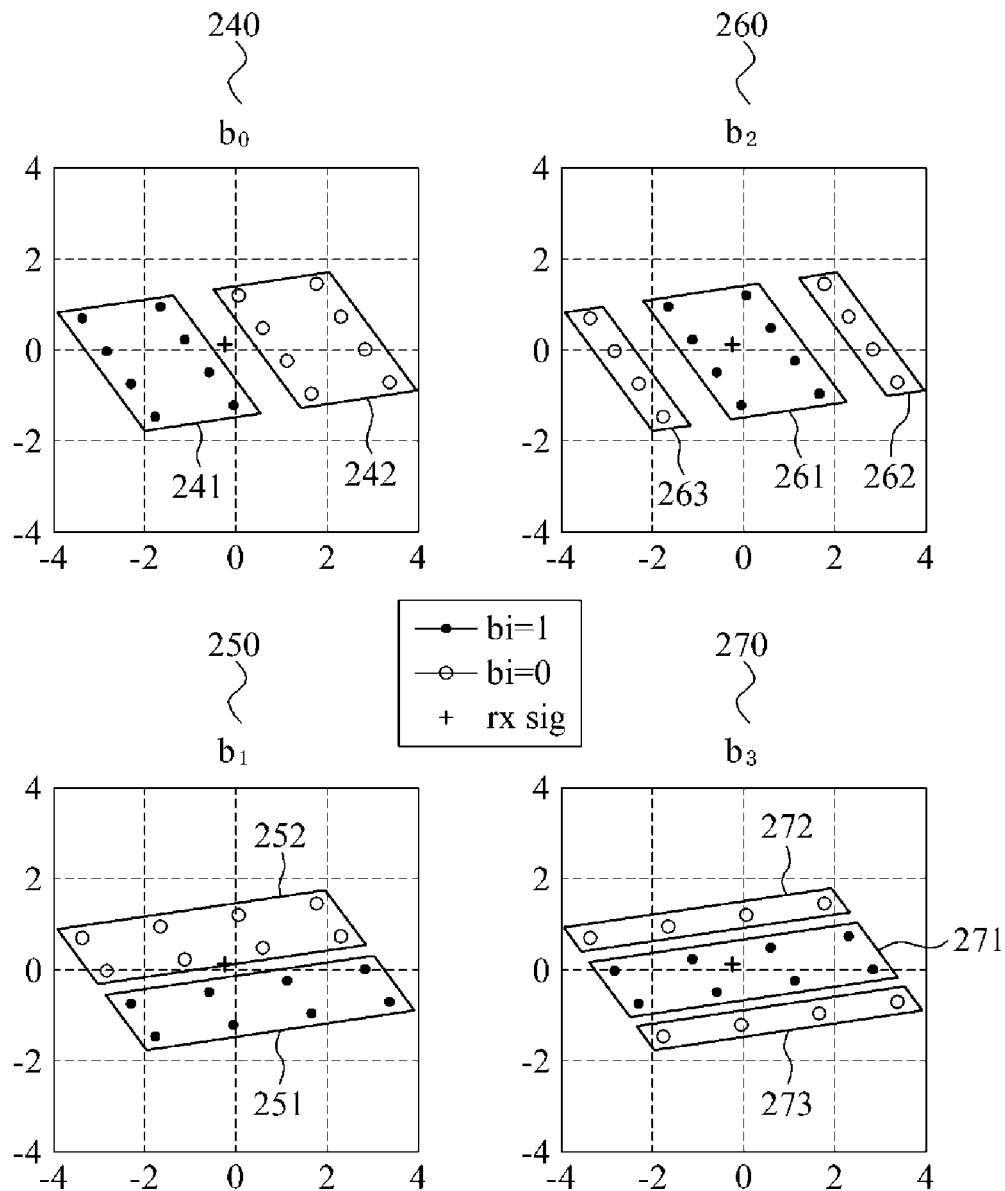
FIG. 2B is a diagram illustrating an example of constellations for a plurality of bits, in accord with an embodiment.

FIG. 2B illustrates an example of a method to calculate an LLR and constellations for a plurality of bits, in accordance with an embodiment.

Referring to FIG. 2B, each of a constellation 240 for a single bit $b_0$, a constellation 250 for a single bit $b_1$, a constellation 260 for a single bit $b_2$, and a constellation 270 for a single bit $b_3$ includes constellation points disposed at a position identical to the constellation points included in the faded rotated 16 QAM constellation 230 of FIG. 2A. The constellation points included in the constellation 240 for the single bit $b_0$, the constellation 250 for the single bit $b_1$, the constellation 260 for the single bit $b_2$, and the constellation 270 for the single bit $b_3$ are partitioned based on a logic value of a corresponding bit. In FIG. 2B, a solid dot ● denotes a constellation point defined by $b_i=1$, and a hollow dot ○ denotes a constellation point derived from $b_i=0$.

For example, the constellation points included in the constellation 240 for the single bit $b_0$ are partitioned into a sub-set 241 of which a logic value of the single bit $b_0$ is "1" and a sub-set 242 of which a logic value of the single bit $b_0$ is "0". The logic value of the single bit $b_0$ for each of the constellation points is identical to the logic value of a first bit $b_0$ indicated in the original 16 QAM constellation 210 of FIG. 2A. The constellation points included in the constellation 250 for the single bit $b_1$ are partitioned into a sub-set 251 of which a logic value of the single bit $b_1$ is "1" and a sub-set 252 of which a logic value of the single bit $b_1$ is "0". The logic value of the single bit $b_1$ in each of the constellation points is identical to the logic value of a second bit $b_1$ indicated in the original 16 QAM constellation 210 of FIG. 2A.

The constellation points included in the constellation 260 for the single bit $b_2$ are partitioned into a sub-set 262 of which a logic value of the single bit $b_2$ is "1" and a sub-set 263 of which a logic value of the single bit $b_2$ is "0". The logic value of the single bit $b_2$ in each of the constellation points is identical to the logic value of a third bit $b_2$ indicated in the original 16 QAM constellation 210 of FIG. 2A. The constellation points included in the constellation 270 for the single bit $b_3$ are partitioned into a sub-set 271 of which a logic value of the single bit $b_3$ is "1" and sub-sets 272 and 273 of which a logic value of the single bit $b_3$ is "0". The logic value of the single bit $b_3$ in each of the constellation points is identical to the logic value of a fourth bit $b_3$ indicated in the original 16 QAM constellation 210 of FIG. 2A. Partition information illustrated in FIG. 2B is merely exemplary, and partitions of the constellations 240, 250, 260, and 270 for a single bit may be subject to change based on a change in the bit information illustrated in FIG. 2A.

When compared to using the general QAM, a great calculation complexity is involved in using the rotated QAM for the receiver to perform a soft demapping. In a case of the general QAM being used, an LLR may be calculated by a one-dimensional (1D) calculation because an I component and a Q component are independent from each other. Conversely, when the rotated QAM is used, a two-dimensional (2D) calculation may be needed for all constellation points included in a constellation due to a correlation between an I component and a Q component.

When the rotated QAM is used, an LLR of a reception signal "r" is calculated for each bit $b_i$, from among a plurality of bits included in a symbol, in order to perform a soft demapping. The LLR with respect to a single bit $b_i$ is defined by Equation 3.

$$LLR(b_i) = \log \frac{\sum_{\tilde{s} \in \mathbb{S}_{b_i}=1} e^{-\frac{(r_I - h_I \tilde{s}_I)^2 + (r_Q - h_Q \tilde{s}_Q)^2}{2\sigma^2}}}{\sum_{\tilde{s} \in \mathbb{S}_{b_i}=0} e^{-\frac{(r_I - h_I \tilde{s}_I)^2 + (r_Q - h_Q \tilde{s}_Q)^2}{2\sigma^2}}}. \quad \text{[Equation 3]}$$

In Equation 3, $LLR(b_i)$ denotes an LLR with respect to an "i"-th single bit from among the plurality of bits included in the symbol. $\sigma^2$ denotes a magnitude of noise, $\mathbb{S}_{b_i}=1$ denotes a sub-set related to $b_i=1$, and $\mathbb{S}_{b_i}=0$ denotes a sub-set related to $b_i=0$.

Based on MAX-log approximation, the LLR may be represented by Equation 4.

$$LLR(b_i) \approx \frac{1}{2\sigma^2} \left[ \min_{\tilde{s} \in \mathbb{S}_{b_i}=0} ((r_I - h_I \tilde{s}_I)^2 + (r_Q - h_Q \tilde{s}_Q)^2) - \min_{\tilde{s} \in \mathbb{S}_{b_i}=1} ((r_I - h_I \tilde{s}_I)^2 + (r_Q - h_Q \tilde{s}_Q)^2) \right]. \quad \text{[Equation 4]}$$

Referring to Equation 4, an LLR calculation with respect to a single bit $b_i$ depends on a Euclidean distance between constellation points in two substantially different sets, for example, a set related to $b_i=0$ and a set related to $b_i=1$, and a reception signal "r". A constellation point closest to the reception signal "r" in the set related to $b_i=0$ and a constellation point closest to the reception signal "r" in the set related to $b_i=1$ are determined to calculate the LLR with respect to the single bit $b_i$ based on Equation 4. Calculating a distance between the reception signal "r" and all the constellation points for the LLR calculation is a direct method to detect transmitted bits. However, a full search algorithm may be complex and large to implement.

A soft demapping apparatus is configured to calculate an LLR with accuracy that is substantially identical to an accuracy of an instance in which the distance between the reception signal "r" and all the constellation points is calculated, without having to calculate the distance between the reception signal "r" and all the constellation points. For example, the soft demapping apparatus may calculate an LLR by calculating a distance between selected candidate constellation points and a reception signal, subsequent to selecting a single candidate constellation point for a plurality of lines, which are formed by a plurality of constellation points in a constellation. Further descriptions pertaining to a method of selecting a candidate constellation point will be later described.

Figure 3A:
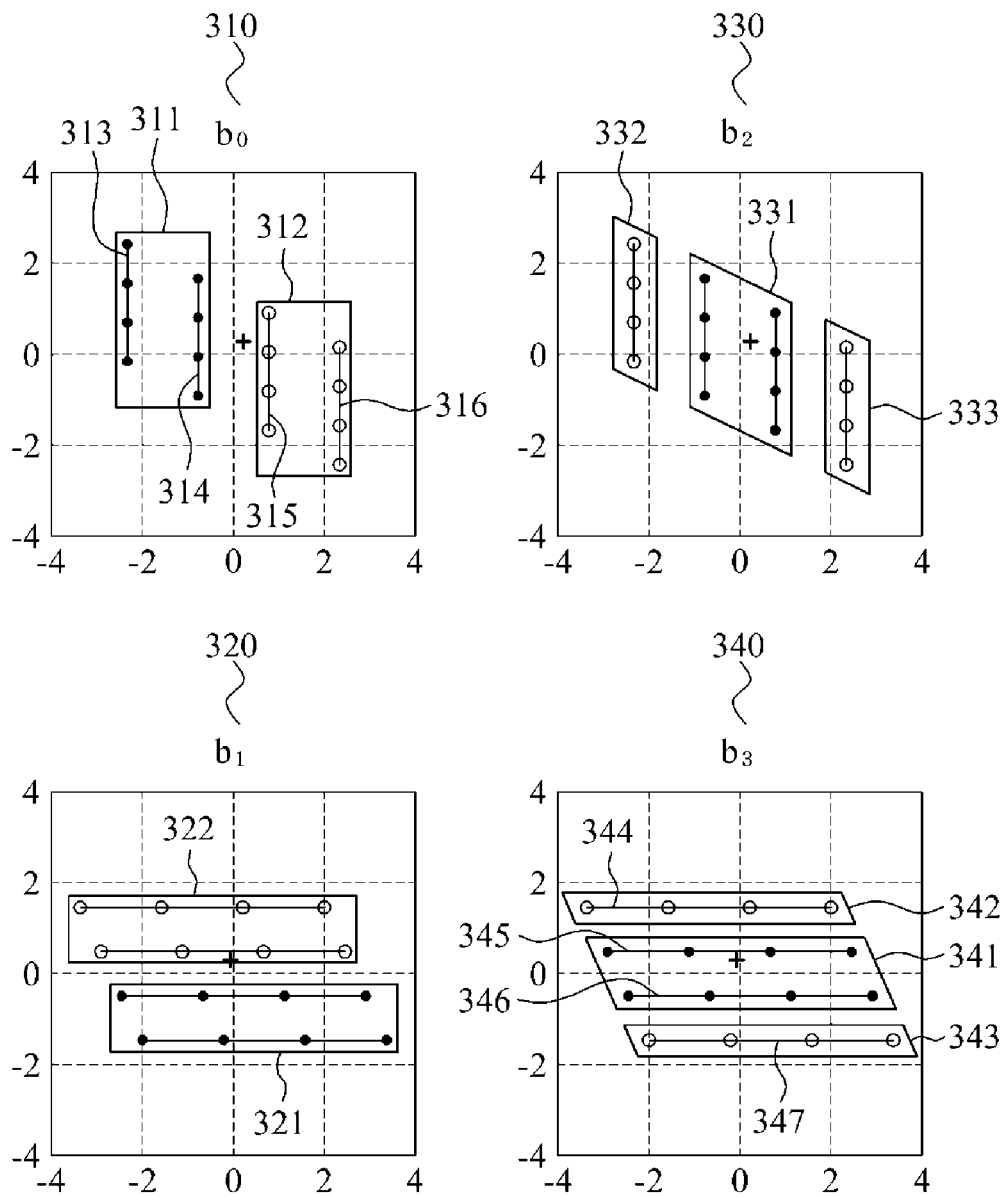
FIG. 3A is a diagram illustrating an example of a vertical 16 QAM constellation and a horizontal 16 QAM constellation for log-likelihood ratio (LLR) calculation for a plurality of bits, in accord with an embodiment.

FIG. 3A illustrates an example of a vertical 16 QAM constellation and a horizontal 16 QAM constellation for LLR calculation of a plurality of bits, in accordance with an embodiment. Referring to FIG. 3A, a soft demapping apparatus rotates the constellations 240, 250, 260, and 270 of FIG. 2B, in a reverse direction, to allow constellation points in the constellations 240, 250, 260, and 270 to be arranged in a form of a horizontally parallel shape or a vertically parallel shape to enable selection of candidate constellation points. For example, the soft demapping apparatus obtains a constellation 310 for a single bit $b_0$ by rotating in a reverse direction the constellation 240 of FIG. 2B. The soft demapping apparatus obtains a constellation 320 for a single bit $b_1$ by rotating in a reverse direction the constellation 250 of FIG. 2B. The soft demapping apparatus also obtains a constellation 330 for a single bit $b_2$ by rotating in a reverse direction the constellation 260 of FIG. 2B. Further, the soft demapping apparatus obtains a constellation 340 for a single bit $b_3$ by rotating in a reverse direction the constellation 270 of FIG. 2B.

The constellation points in the constellation 310 for the single bit $b_0$, the constellation 320 for the single bit $b_1$, the constellation 330 for the single bit $b_2$, and the constellation 340 for the single bit $b_3$ are partitioned based on a logic value of a corresponding bit. In FIG. 3A, ● denotes a constellation point defined by $b_i=1$, and ○ denotes a constellation point derived from $b_i=1$. The constellation points included in the constellation 310 for the single bit $b_0$ are partitioned to a sub-set 311, of which a logic value of the single bit $b_0$ is "1" and a sub-set 312 of which a logic value of the single bit $b_0$ is "0". The constellation points in the constellation 320 for the single bit $b_1$ are partitioned to a sub-set 321 of which a logic value of the single bit $b_1$ is "1" and a sub-set 322 of which a logic value of the single bit $b_1$ is "0". The constellation points in the constellation 330 for the single bit $b_2$ are partitioned to a sub-set 331 of which a logic value of the single bit $b_2$ is "1" and sub-sets 332 and 333 of which a logic value of the single bit $b_2$ is "0". The constellation points in the constellation 340 for the single bit $b_3$ are partitioned to a sub-set 341 of which a logic value of the single bit $b_3$ is "1" and sub-sets 342 and 343 of which a logic value of the single bit $b_3$ is "0". Partition information illustrated in FIG. 3A is merely exemplary. The constellation points in each constellation for a single bit may be partitioned as different sub-sets, each with an alternative logic value than the logic value illustrated in FIG. 3A. Also, partitions of the constellations 310, 320, 330, and 340 rotated in the reverse direction for the single bit may be subject to change in rotation based on a change in the bit information illustrated in FIG. 2A.

However, partitions may not necessarily require a received constellation to rotate in a reverse direction. Also, examples provided herein may also be applied to a constellation in a vertically parallel shape or a horizontally parallel shape, and to a constellation in an irregular shape.

The constellation 310 for the single bit $b_0$ and the constellation 330 for the single bit $b_2$ have constellation points are vertically parallel by being rotated in a reverse direction. Constellation points in an identical column, with respect to the constellation points in a vertically parallel shape, belong to the same sub-set. For example, in the constellation 310 for the single bit $b_0$, constellation points on a first line 313 corresponding to a first column all belong to the sub-set 311, and constellation points on a second line 314 corresponding to a second column all belong to the sub-set 311. Constellation points on a third line 315 corresponding to a third column all belong to the sub-set 312, and constellation points on a fourth line 316 corresponding to a fourth column all belong to the sub-set 312.

Figure 3B:
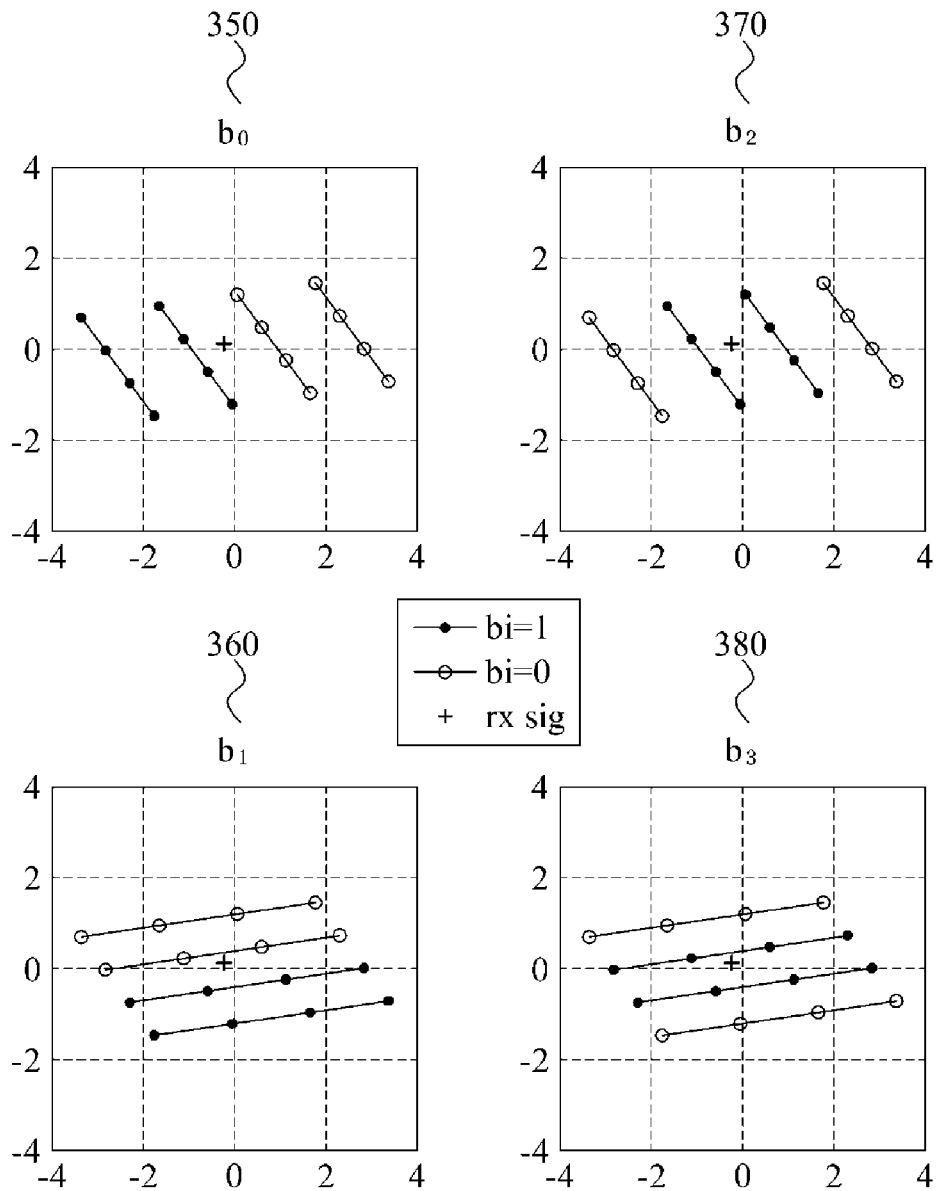
FIG. 3B is a diagram illustrating an example of a non-vertical 16 QAM constellation or a non-horizontal 16 QAM constellation for LLR calculation for a plurality of bits, in accord with an embodiment.

The constellation 320 for the single bit $b_1$ and the constellation 340 for the single bit $b_3$ have constellation points in a horizontally parallel shape. Constellation points in an identical row, with respect to the constellation points that are horizontally parallel, belong to the same sub-set. For example, in the constellation 340 for the single bit $b_3$, constellation points on a fifth line 344, corresponding to a first row, belong to the sub-set 342. Also, constellation points on a sixth line 345, corresponding to a second row, belong to the sub-set 341. Constellation points on a seventh line 346, corresponding to a third row, belong to the sub-set 341. Further, constellation points on an eighth line 347, corresponding to a fourth row, all belong to the sub-set 343. Lines illustrated in FIG. 3B are merely exemplary, and lines of constellations 350, 360, 370, and 380 for single bits may be modified based on a change in the bit information shown in FIG. 2A.

Due to such configuration described above, a soft demapping algorithm may be simplified. The soft demapping apparatus selects, for an odd-numbered bit a single candidate closest to a reception signal for each column from the constellations 310 and 330, and, for an even-numbered bit, selects a single candidate closest to a reception signal for each row from the constellations 320 and 340. By way of example, in a vertically parallel shape, a best candidate, for example, a constellation point having a minimum distance to a reception signal, in a single column is determined.

The soft demapping apparatus need not calculate a distance between the reception signal and the constellation points to select candidates. The soft demapping apparatus vertically projects the reception signal to each row or each column, and selects a constellation point closest to a point at which the reception signal is projected as a candidate for a corresponding row or a corresponding column. For example, a best candidate in a single column is determined by vertically projecting a reception signal to a corresponding column. The soft demapping apparatus determines a constellation point closest to the point at which the reception signal is vertically projected to the corresponding column to be the best candidate for the corresponding column. The soft demapping apparatus determines the best candidate with respect to a plurality of columns, and obtains a reduced number of candidate sets by collecting a best candidate for each column.

Subsequent to selecting the candidates, the soft demapping apparatus calculates an LLR by calculating a distance between the selected candidates and the reception signal. For example, a Euclidean distance between a reception signal "r" and a best candidate may be calculated. When an M-QAM symbol is used, where "M"=$2^n$, and "n" is an integer greater than two, an LLR is calculated by calculating a distance between a $\sqrt{M}$ number of constellation points and a reception signal, rather than calculating a distance between a total of "M" number of constellation points and a reception signal.

Constellation points having a minimum distance obtained by using the reduced $\sqrt{M}$ number of candidate sets are identical to constellation points having a minimum distance obtained by using the total of "M" number of point sets. Accordingly, the soft demapping apparatus is configured to calculate an accurate LLR devoid of a corner case, without calculating a 2D distance between all the constellation points and the reception signal. Further descriptions pertaining to the simplified soft demapping algorithm will be discussed with reference to FIGS. 4A and 4B later.

FIG. 3B illustrates an example of a non-vertical 16 QAM constellation or a non-horizontal 16 QAM constellation for LLR calculation for a plurality of bits, in accord with an embodiment. Referring to FIG. 3B, as described above, it should be noted that a vertically parallel shape or a horizontally parallel shape are for illustrative purposes. The constellation 350 for the single bit $b_0$ and the constellation 370 for the single bit $b_2$ have constellation points in a form rotated by a predetermined angle in a counter-clockwise direction from a vertically parallel shape. Constellation points on an identical line, with respect to the constellation points in the form rotated by the predetermined degree in the counter-clockwise direction from the vertically parallel shape, belong to the same sub-set at all times. The constellation 360 for the single bit $b_1$ and the constellation 380 for the single bit $b_3$ have constellation points in a form rotated by a predetermined degree in a counter-clockwise direction from a horizontally parallel shape. Constellation points on a same line with respect to the constellation points in the form rotated by the determined degree in the counter-clockwise direction from the horizontally parallel shape belong to the same sub-set at all times. As described in the preceding with respect to FIG. 3A, due to such characteristics, the soft demapping algorithm may be simplified.

Figure 4A:
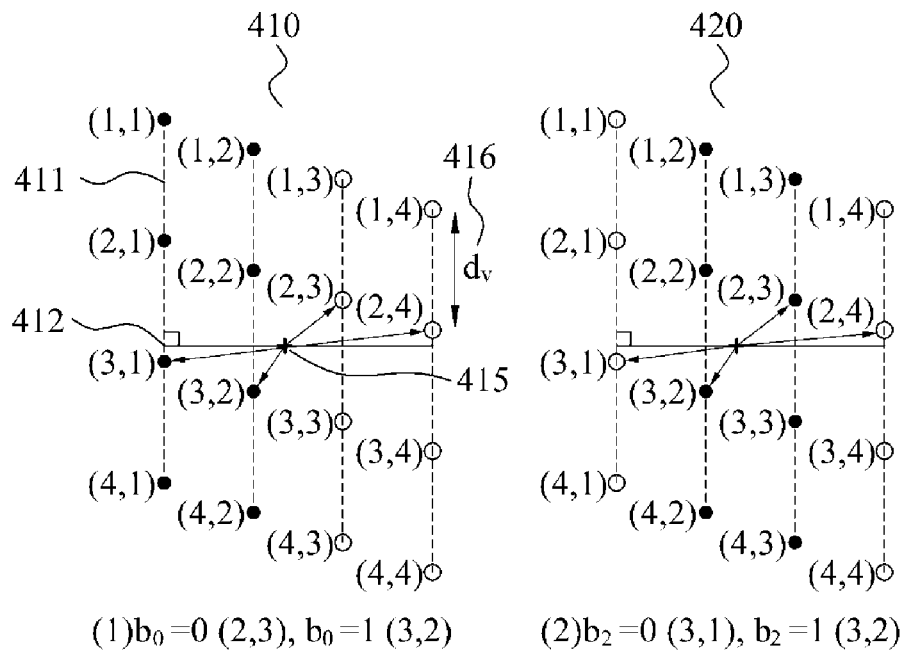
FIG. 4A is a diagram illustrating an example to select a candidate for LLR calculation in a vertical 16 QAM constellation and a horizontal 16 QAM constellation, in accord with an embodiment.
Figure 4A:
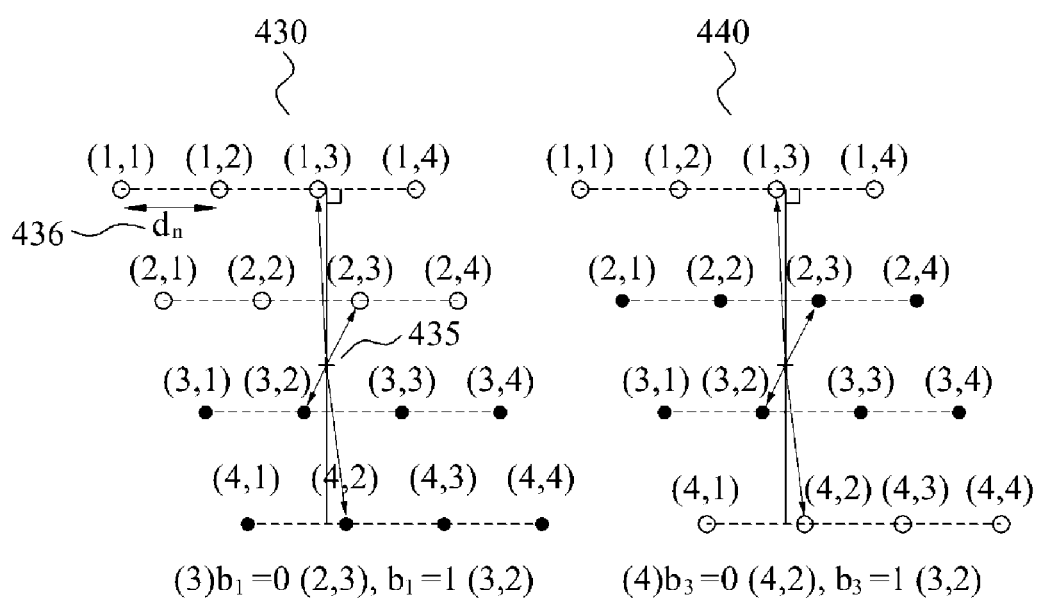

FIG. 4A illustrates an example of selecting a candidate for LLR calculation in a vertical 16 QAM constellation and a horizontal 16 QAM constellation, in accord with an embodiment. Referring to FIG. 4A, each of four columns in constellations 410 and 420 includes four constellation points, and each of four rows in constellations 430 and 440 includes four constellation points.

In an illustrative example, the constellation 410 has constellation points in a vertically parallel shape. In this example, a single best candidate is readily determined for a plurality of columns. A best candidate is determined without calculating four distances between four constellation points in a single column and a reception signal. The soft demapping apparatus vertically projects a reception signal 415 to each column, and selects a constellation point closest to a point at which the reception signal 415 is vertically projected as a best candidate for a corresponding column. The soft demapping apparatus readily determines the constellation point closest to the projection point because an interval between the constellation points included in each column in the constellation 410 is predetermined to be "$d_v$" 416. For example, a point 412 at which the reception signal 415 is projected to a column 411 is disposed between a constellation point (2, 1) and a constellation point (3, 1). A best candidate for the column 411 is determined to be the constellation point (3, 1) because the interval between the constellation point (2, 1) and the constellation point (3, 1) is "$d_v$" 416 and the projection point 412 is within a distance of "$d_v/2$" from the constellation point (3, 1). In a similar manner, best candidates in the constellation 410 are determined to be (3, 1), (3, 2), (2, 3), and (2, 4). The soft demapping apparatus calculates an LLR for a corresponding bit based on a single best candidate for each column.

The soft demapping apparatus is enabled to simplify an entire LLR calculation process. Referring to Equation 4 provided in the foregoing, a constellation point closest to the reception signal 415 in a sub-set of which a logic value of $b_0$ is "1" and a constellation point closest to the reception signal 415 in a sub-set of which a logic value of $b_0$ is "0", need to be determined in order to calculate an LLR for a single bit $b_0$. The soft demapping apparatus calculates an LLR with an accuracy that is identical to an accuracy to calculate a distance between all constellation points and a reception signal by calculating a distance between four best candidates selected for each column and a reception signal. In the constellation 410, the constellation point closest to the reception signal 415 in the sub-set of which the logic value of $b_0$ is "1" corresponds to the constellation point (3, 2), and the constellation point closest to the reception signal 415 in the sub-set of which the logic value of $b_0$ is "0" corresponds to the constellation point (2, 3).

In this example, a reduced number of candidate sets may be used in common Referring to the constellation 410 and the constellation 420 of FIG. 4A, candidates at $b_0$ and $b_2$ are identical to one another. For example, the constellation points (3, 1), (3, 2), (2, 3), and (2, 4) are the candidates at $b_0$ and $b_2$. A difference is that each of the candidates may belong to a different sub-set for a plurality of differing bits. For example, (3, 1) belongs to a sub-set related to "$b_0=1$" in the constellation 410, and (3, 1) belongs to a sub-set related to "$b_2=0$" in the constellation 420. Indices of candidates included in a reduced number of candidate sets with respect to a predetermined bit and a pre-calculated distance between the candidates and a reception signal may also be used for other bits as a lookup table (LUT). For example, distances between each of best candidate constellation points (3, 1), (3, 2), (2, 3), and (2, 4) for each column at $b_0$ and a reception signal are calculated. Indices of the constellation points (3, 1), (3, 2), (2, 3), and (2, 4) are recorded in the LUT. The distances between the constellation points (3, 1), (3, 2), (2, 3), and (2, 4) and the reception signal are recorded in the LUT. The LUT may be re-used for a process of calculating an LLR with respect to bit $b_2$. In the constellation 420, a constellation point closest to a reception signal in a sub-set of which a logic value of $b_2$ is "1" corresponds to the constellation point (3, 2). Also, a constellation point closest to a reception signal in a sub-set of which a logic value of $b_2$ is "0" corresponds to the constellation point (3, 1).

In a similar manner, in an example in which the constellation 430 has constellation points in a horizontally parallel shape, a single best candidate may be readily determined for a plurality of rows. According to an example, a best candidate is determined without calculating four distances between four constellation points in a single row and a reception signal. The soft demapping apparatus vertically projects a reception signal 435 to each row, and selects a constellation point closest to a point at which the reception signal 435 is vertically projected as a best candidate for a corresponding row. The soft demapping apparatus readily determines the constellation point closest to the projection point because an interval between constellation points in each row in the constellation 430 is predetermined to be "$d_n$" 436. In a similar manner, best candidates in the constellation 430 are determined to be (1, 3), (2, 3), (3, 2), and (4, 2). The soft demapping apparatus calculates an LLR for a corresponding bit based on a single best candidate for each row.

Through this, an entire LLR calculation process may be simplified. Referring to Equation 4 provided above, a constellation point closest to the reception signal 435 in a sub-set of which a logic value of $b_1$ is "1" and a constellation point closest to the reception signal 435 in a sub-set of which a logic value of $b_1$ is "0", are determined to calculate an LLR for a single bit $b_1$. The soft demapping apparatus calculates an LLR, with accuracy identical to the accuracy of a calculation of a distance between all constellation points and a reception signal, by calculating a distance between four best candidates selected for each row and a reception signal. In the constellation 430, the constellation point closest to the reception signal 435 in the sub-set of which the logic value of $b_1$ is "1" corresponds to the constellation point (3, 2), and the constellation point closest to the reception signal 435 in the sub-set of which the logic value of $b_1$ is "0" corresponds to the constellation point (2, 3).

In this example, a reduced number of candidate sets may be commonly used. Referring to the constellation 430 and the constellation 440 of FIG. 4A, candidates with respect to $b_1$ and $b_3$ are identical to one another. For example, the constellation points (1, 3), (2, 3), (3, 2), and (4, 2) are the candidates of $b_1$ and $b_3$. A difference is that each of the candidates may belong to a different sub-set for a plurality of differing bits. For example, (4, 2) belongs to a sub-set related to "$b_1=1$" in the constellation 430, and (4, 2) belongs to a sub-set related to "$b_3=0$" in the constellation 440. Indices of candidates in a reduced number of candidate sets with respect to a predetermined bit and a pre-calculated distance between the candidates and a reception signal may also be used for other bits as an LUT. For example, distances between each of best candidate constellation points (1, 3), (2, 3), (3, 2), and (4, 2) for each row of $b_1$ and a reception signal are calculated. Indices of the constellation points (1, 3), (2, 3), (3, 2), and (4, 2) are recorded in the LUT. The distances between the constellation points (1, 3), (2, 3), (3, 2), and (4, 2) and the reception signal are recorded in the LUT. The LUT may be re-used in a process to calculate an LLR with respect to $b_3$. In the constellation 440, a constellation point closest to a reception signal in a sub-set of which a logic value of $b_3$ is "1" corresponds to the constellation point (3, 2) and a constellation point closest to a reception signal in a sub-set of which a logic value of $b_3$ is "0" corresponds to the constellation point (4, 2).

Figure 4B:
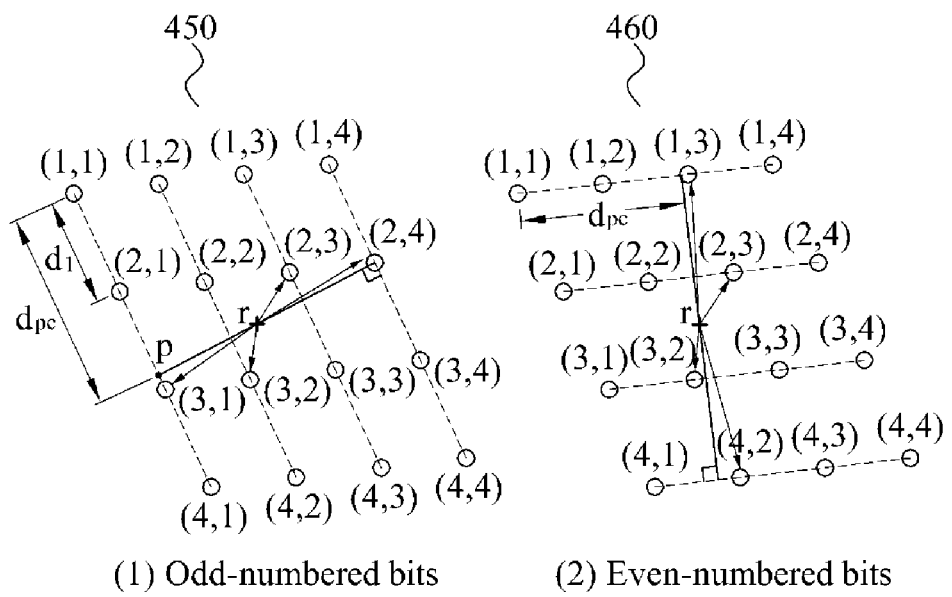
FIG. 4B is a diagram illustrating an example to select a candidate for LLR calculation in a non-vertical 16 QAM constellation or a non-horizontal 16 QAM constellation, in accord with an embodiment.

FIG. 4B illustrates an example of selecting a candidate for LLR calculation in a non-vertical 16 QAM constellation or a non-horizontal 16 QAM constellation, in accord with an embodiment.

Referring to FIG. 4B, a vertically parallel shape or a horizontally parallel shape are optional in examples provided herein. A single best candidate for a plurality of lines is easily determined. For example, a reception signal is vertically projected to the plurality of lines, and a single best candidate for a corresponding line is determined.

An LLR for a corresponding bit is calculated based on a single best candidate for a plurality of lines, instead of calculating all distances between constellation points for the plurality of lines and a reception signal and calculating LLRs based on the calculated distances. Accordingly, an entire LLR calculation process may be simplified.

Referring to the constellation 450, a distance is calculated between each of best candidate constellation points (3, 1), (3, 2), (2, 3), and (2, 4) for a plurality of lines of odd-numbered bits, for example, $b_0$ and $b_2$, and a reception signal. Indices of the constellation points (3, 1), (3, 2), (2, 3), and (2, 4) are recorded in the LUT. The distances between the constellation points (3, 1), (3, 2), (2, 3), and (2, 4) and the reception signal are recorded in the LUT. The LUT may be re-used for a process of calculating an LLR with respect to other bits.

Referring to the constellation 460, a distance is calculated between each of best candidate constellation points (1, 3), (2, 3), (3, 2), and (4, 2) for a plurality of lines of even-numbered bits, for example, $b_1$ and $b_3$, and a reception signal. Indices of the constellation points (1, 3), (2, 3), (3, 2), and (4, 2) are recorded in the LUT. The distances between the constellation points (1, 3), (2, 3), (3, 2), and (4, 2) and the reception signal are recorded in the LUT. The LUT may be re-used for a process of calculating an LLR with respect to other bits.

In general, the soft demapping apparatus includes a selection unit and a calculation unit. Based on a reception signal, the selection unit selects a candidate constellation point for each of a plurality of lines formed by a plurality of constellation points in a constellation for a single bit, from among a plurality of bits in a symbol used for data transmission. The calculation unit calculates an LLR with respect to the single bit based on the reception signal and the selected candidate constellation points.

Figure 5:
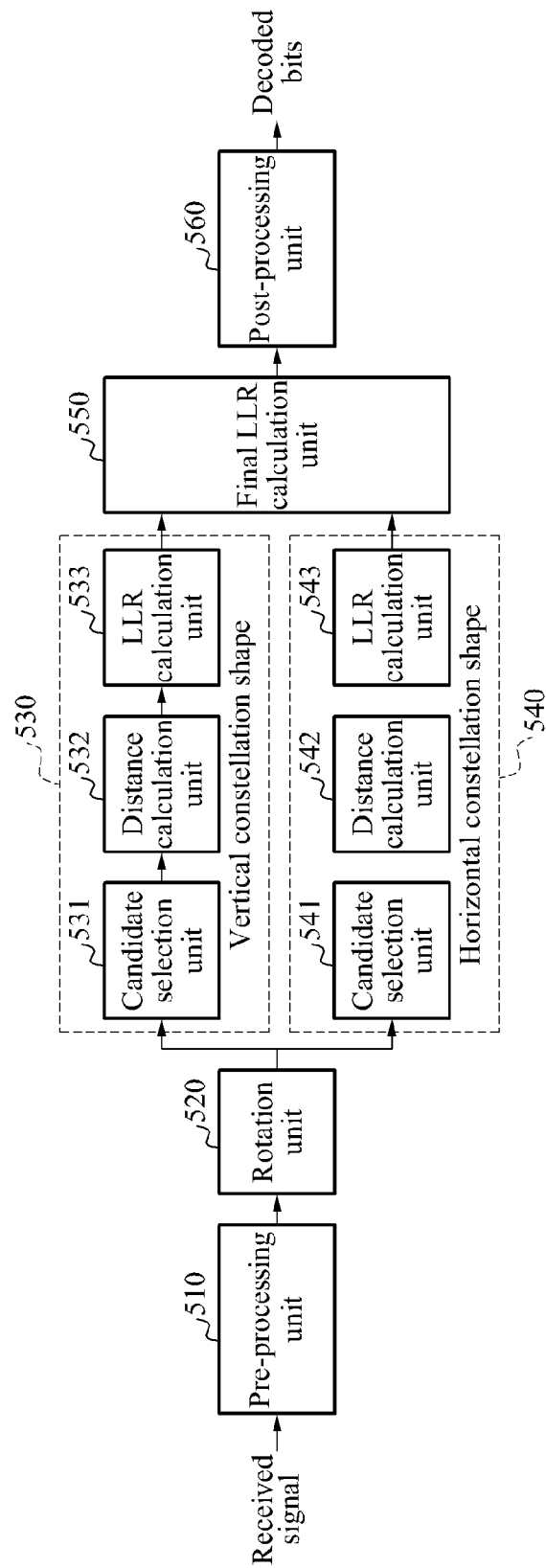
FIG. 5 is a block diagram illustrating an example of a soft demapping apparatus, in accord with an embodiment.

FIG. 5 illustrates an example of a soft demapping apparatus, in accordance with an embodiment. The selection unit of the soft demapping apparatus includes a candidate selection unit 531, and the calculation unit includes a distance calculation unit 532 and an LLR calculation unit 533. The soft demapping apparatus further includes a pre-processing unit 510, a final LLR calculation unit 550, and a post-processing unit 560.

The pre-processing unit 510 receives from a transmitter a reception signal from a symbol representing a plurality of bits. As used herein, the symbol may refer to an M-QAM symbol, where "M"=$2^n$ and "n" is an integer greater than two. According to an example, the soft demapping apparatus further includes a rotation unit 520. The rotation unit 520 rotates a constellation of a reception signal in a reverse direction to allow the constellation to have a vertically parallel shape or a horizontally parallel shape. When the constellation of the reception signal is rotated in a reverse direction, the reversely rotated constellation has a vertically parallel shape or a horizontally parallel shape as shown in FIG. 4A. However, referring to FIG. 4B, examples may not necessarily require the constellation to have the vertically parallel shape or the horizontally parallel shape. Hereinafter, an example of the rotation unit 520 rotating a constellation of a reception signal in a reverse direction to enable the constellation to have a vertically parallel shape or a horizontally parallel shape will be used for ease of description.

When a constellation is provided in a form of a vertically parallel shape or a horizontally parallel shape, a reception signal is processed individually by each structural element 530 and 540, with respect to the constellation in a vertically parallel shape and the constellation in a horizontally parallel shape. For example, the block 530 calculates an LLR for a plurality of bits corresponding to the vertical constellation shape. The block 540 calculates an LLR for a plurality of bits corresponding to the horizontal constellation shape.

Candidate selection units 531 and 541 select at least two candidates from among constellation points in a constellation rotated in a reverse direction with respect to a plurality of bits. For example, in the constellation 410 of FIG. 4A, a single point is selected as a candidate for each column including a $\sqrt{M}$ number of constellation points. In a similar manner, in the constellation 430 of FIG. 4A, a single point is selected as a candidate for each row including a $\sqrt{M}$ number of constellation points. The candidate selection units 531 and 541 select at least one candidate with respect to an instance in which each of the plurality of bits, from among the constellation points in the constellation, corresponds to a first logic value. The candidate selection units 531 and 541 also select at least one alternative candidate with respect to an instance in which each of the plurality of bits, from among the constellation points in the constellation, corresponds to a second logic value. For example, in the constellation 410 of FIG. 4A, constellation points (2, 3) and (2, 4) are selected as candidates with respect to an instance in which $b_0$ bit is "0", and constellation points (3, 1) and (3, 2) are selected as candidates with respect to an instance in which $b_0$ bit is "1".

Distance calculation units 532 and 542 calculate a Euclidean distance between a reception signal and at least two candidates. For example, in the constellation 410 of FIG. 4A, Euclidean distances to constellation points (3, 1), (3, 2), (2, 3), and (2, 4) are calculated for LLR calculation of $b_0$. The Euclidean distances to the calculated constellation points (3, 1), (3, 2), (2, 3), and (2, 4) are stored in an LUT for LLR calculation of $b_2$ bit. Indices of the constellation points (3, 1), (3, 2), (2, 3), and (2, 4) are stored along with the Euclidean distances to the calculated constellation points (3, 1), (3, 2), (2, 3), and (2, 4). In a similar manner, in the constellation 430 of FIG. 4A, Euclidean distances to constellation points (1, 3), (2, 3), (3, 2), and (4, 2) are calculated for LLR calculation of $b_1$. The Euclidean distances to the calculated constellation points (1, 3), (2, 3), (3, 2), and (4, 2) are stored in an LUT for LLR calculation of $b_2$. Indices of the constellation points (1, 3), (2, 3), (3, 2), and (4, 2) are stored along with the Euclidean distances to the calculated constellation points (1, 3), (2, 3), (3, 2), and (4, 2).

LLR calculation units 533 and 543 calculate an LLR with respect to the plurality of bits based on the Euclidean distance between the reception signal and the at least two candidates. For one example, the LLR calculation unit 533 calculates an LLR of $b_0$ using the Euclidean distances to the constellation points (3, 1), (3, 2), (2, 3), and (2, 4), which were calculated at the distance calculation unit 532. The LLR calculation unit 533 calculates an LLR of $b_0$ using a constellation point of which a Euclidean distance is shortest from among constellation points with respect to an instance in which $b_0$ is "0", and a constellation point of which a Euclidean distance is shortest from among the constellation points with respect to an instance in which $b_0$ is "1". The Euclidean distance to the constellation point (2, 3) is used for the instance in which $b_0$ is "0", and the Euclidean distance to the constellation point (3, 2) is used for the instance in which $b_0$ is "1".

In another example, the LLR calculation unit 543 calculates an LLR of $b_1$ using the Euclidean distances to the constellation points (1, 3), (2, 3), (3, 2), and (4, 2), which were calculated at the distance calculation unit 542. The LLR calculation unit 543 calculates an LLR of $b_1$ using a constellation point of which a Euclidean distance is shortest from among constellation points with respect to an instance in which $b_1$ is "0", and a constellation point of which a Euclidean distance is shortest from among the constellation points with respect to an instance in which $b_1$ is "1". The Euclidean distance to the constellation point (2, 3) is used for the instance in which $b_1$ is "0", and the Euclidean distance to the constellation point (3, 2) is used for the instance in which $b_1$ is "1".

The Euclidean distance between the reception signal and the at least two candidates and an index for each of the at least two candidates are stored in the LUT with respect to a predetermined bit. The LLR calculation units 533 and 543 calculate an LLR for another bit using the Euclidean distance between the reception signal and the at least two candidates and the index of each of the at least two candidates with respect to the predetermined bit. In one example, the LLR calculation unit 533 calculates an LLR of $b_2$ using the Euclidean distances and the indices stored in the LUT. The LLR calculation unit 533 calculates an LLR of $b_2$ bit using a constellation point of which a Euclidean distance is shortest from among constellation points with respect to an instance in which $b_2$ is "0" and a constellation point of which a Euclidean distance is shortest from among the constellation points with respect to an instance in which $b_2$ is "1". The Euclidean distance to the constellation point (3, 1) is used for the instance in which $b_2$ is "0", and the Euclidean distance to the constellation point (3, 2) is used for the instance in which $b_2$ is "1"

For another example, the LLR calculation unit 543 calculates an LLR of $b_3$ using the Euclidean distances and the indices stored in the LUT. The LLR calculation unit 543 calculates an LLR of $b_3$ using a constellation point of which a Euclidean distance is shortest from among constellation points with respect to an instance in which $b_3$ is "0" and a constellation point of which a Euclidean distance is shortest from among the constellation points with respect to an instance in which $b_3$ is "1". The Euclidean distance to the constellation point (4, 2) is used for the instance in which $b_3$ is "0", and the Euclidean distance to the constellation point (3, 2) is used for the instance in which $b_3$ is "1".

The final LLR calculation unit 550 combines LLRs of a plurality of bits to detect the plurality of bits. LLRs with respect to $\{b_0, b_2, \ldots b_{n-2}\}$ and $\{b_1, b_3, \ldots b_{n-1}\}$ are combined.

The post-processing unit 560 decodes the plurality of bits using the combined LLRs. Descriptions of FIGS. 1 through 4B provided in the preceding may be applied to each module shown in FIG. 5 and thus, repeated descriptions will be omitted for conciseness.

Figure 6:
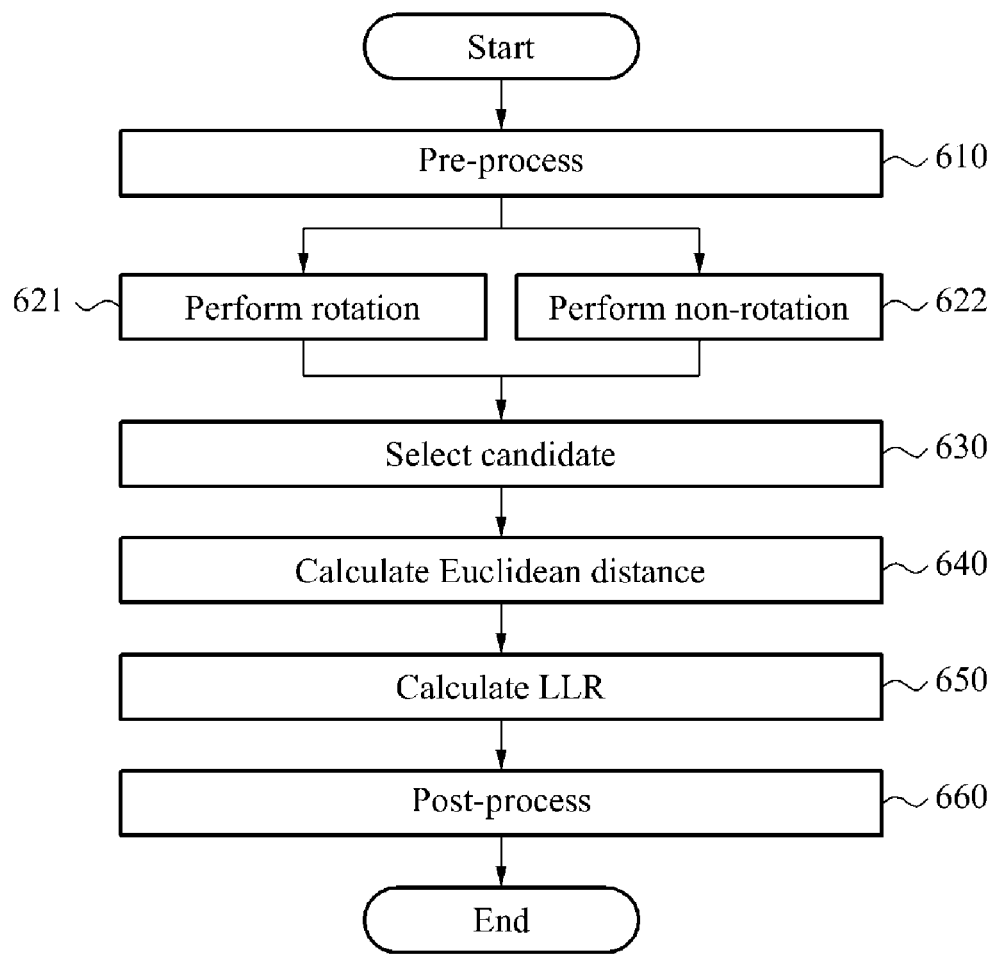
FIG. 6 is a flowchart illustrating an example of a soft demapping method, in accord with an embodiment.

FIG. 6 illustrates an example of a soft demapping method, in accord with an embodiment.

In 650, an LLR for each of the plurality of bits is calculated based on a distance between candidate constellation points and a reception signal.

At operation 610, the soft demapping method pre-processes in which a reception signal from a transmitter is received from a symbol representing the plurality of bits. At operation 621, the soft demapping method rotates in a reverse direction a constellation of a corresponding single bit for each of the plurality of bits. The constellation rotated reversely includes a plurality of constellation points forming a plurality of lines provided in a form of a vertically parallel shape or a horizontally parallel shape. At operation 630, at least two candidate constellation points are selected for each of a plurality of bits included in a symbol used for data transmission. For example, at operation 630, the soft demapping process selects a single candidate constellation point for each of the plurality of lines formed in a constellation for a single bit, in a vertically parallel shape or a horizontally parallel shape.

In another example, at operation 622, the soft demapping method does not rotate or excludes from rotating in a reverse direction the constellation of the corresponding single bit for each of the plurality of bits. The constellation for each of the plurality of bits includes a plurality of lines provided in a form of a non-vertical parallel shape or a non-horizontal parallel shape. In response to the constellation not rotated in a reverse direction, at operation 630, the soft demapping method selects a single candidate for each of the plurality of lines provided in the form of a non-vertical parallel shape or a non-horizontal parallel shape.

At operation 640, the soft demapping method further includes calculating a Euclidean distance between a reception signal and at least two candidates. For one example, at operation 640, Euclidean distances between candidates selected for each of a plurality of horizontal lines and a reception signal are calculated. At operation 650, the soft demapping method calculates an LLR for each of a plurality of bits based on Equation 4. The soft demapping method calculates the LLR with respect to a single bit $b_0$ based on a difference between a Euclidean distance of a candidate closest to the reception signal from among candidates of which a logic value of a single bit $b_0$ is "1" and a Euclidean distance of a candidate closest to the reception signal, from among candidates of which a logic value of the single bit $b_0$ is "0". In a similar manner, the soft demapping method calculates the LLR with respect to a single bit $b_1$ based on a difference between a Euclidean distance of a candidate closest to the reception signal, from among candidates of which a logic value of a single bit $b_1$ is "1" and a Euclidean distance of a candidate closest to the reception signal from among candidates of which a logic value of the single bit $b_1$ is "0". At operation 660, the soft demapping method further includes detecting bits by post-processing. Descriptions of FIGS. 1 through 5 provided in the preceding may be applied to each operation described in FIG. 6 and thus, repeated descriptions will be omitted for conciseness.

FIGS. 7A through 7D illustrate examples of a method of selecting a best candidate for a plurality of lines, in accordance with an embodiment.

Figure 7A:
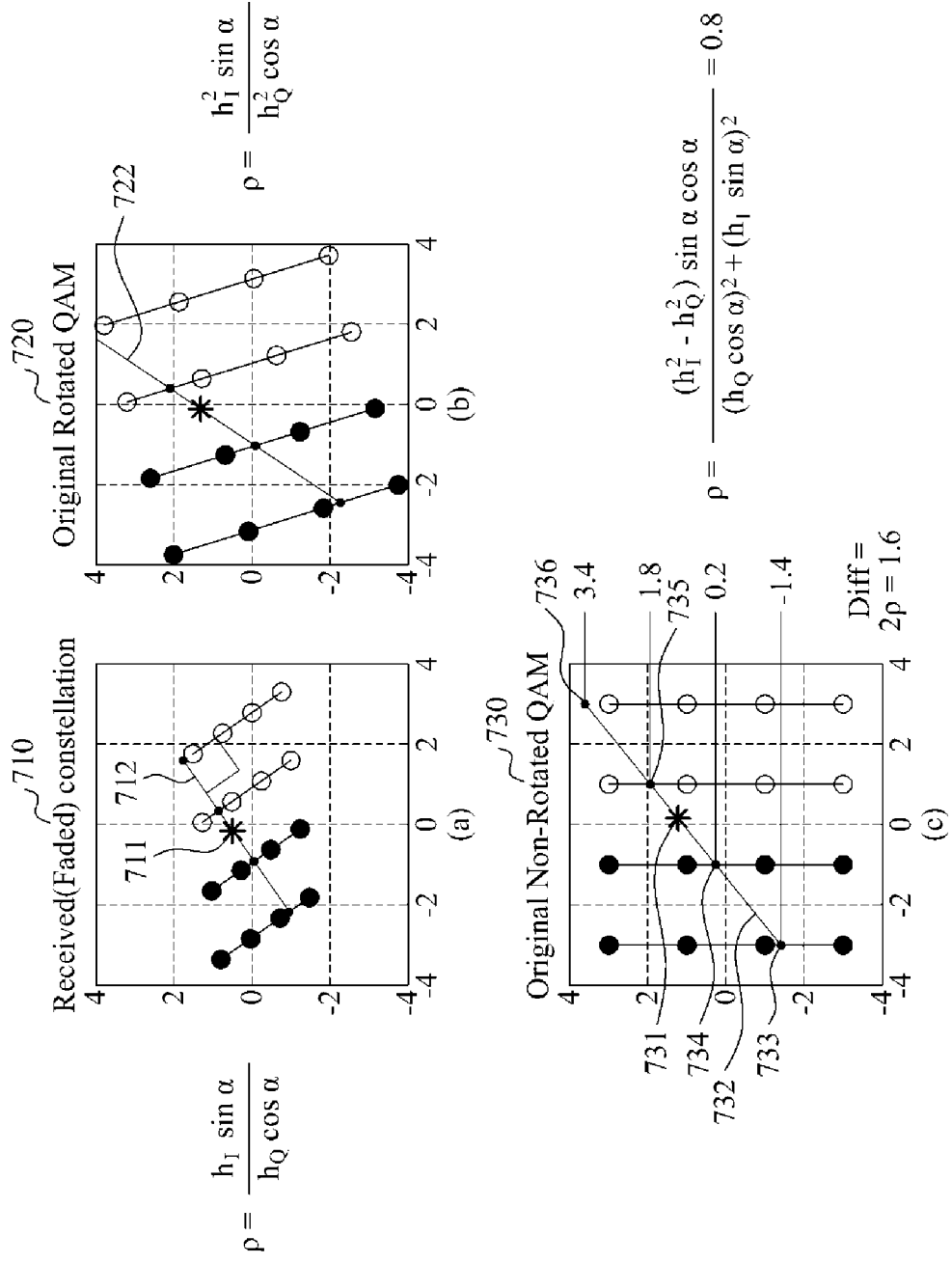
FIGS. 7A through 7D are diagrams illustrating examples of a method to select a best candidate for a plurality of lines, in accord with an embodiment.

Referring to FIG. 7A, both of a channel state and a rotation angle of a constellation are applied to a constellation 710 of a reception signal. The constellation 710 of the reception signal corresponds to the faded rotated 16 QAM constellation 230 of FIG. 2. The constellation 710 of the reception signal changes to an original non-rotated constellation 730. For example, the constellation 710 of the reception signal changes to an original rotated constellation 720 by being scaled based on a state of an I channel and a state of a Q channel. The original rotated constellation 720 changes to the original non-rotated constellation 730 by being rotated at a rotation angle of a constellation.

In response to the constellation 710 of the reception signal changing to the original non-rotated constellation 730, a projection line 712 to project a reception signal 711 to a plurality of lines changes correspondingly in the constellation 710 of the reception signal. For example, the projection line 712 changes to a reference line 732 as the constellation 710 of the reception signal changes to the original non-rotated constellation 730. The projection line 712 in the constellation 710 of the reception signal lies at right angles to the plurality of lines; however, the reference line 732 in the original non-rotated constellation 730 is not disposed at right angles to the plurality of lines. Alternatively, a gradient of the reference line 732 is predetermined based on a reception signal equalized by channel information.

A coordinate value of points to which a reception signal 731 is projected based on the reference line 732, and relative positions amongst projection points are continuously maintained in the original non-rotated constellation 730. Through pre-processing, expansion, contraction, or rotation a constellation, for example, may be simplified based on such a characteristic.

Figure 7B:
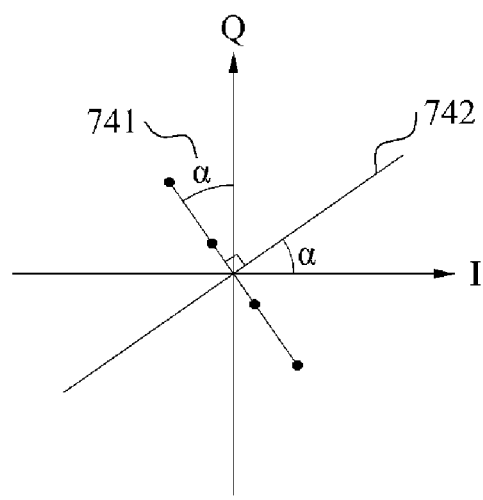

A gradient of the projection line 712 in the constellation 710 of the reception signal is calculated to be $$\frac{h_I \sin\alpha}{h_Q \cos\alpha},$$

where "α" denotes an angle obtained through a constellation being rotated, "$h_I$" denotes a state of an I channel, and "$h_Q$" denotes a state of a Q channel. Referring to FIG. 7B, in an absence of an occurrence of channel degradation, when a rotation angle of a constellation is "α" 741, a gradient of a projection line 742 is tan(α). Accordingly, the gradient of the projection line 742 in an absence of channel degradation is represented by $$\frac{\sin\alpha}{\cos\alpha}.$$

Figure 7C:
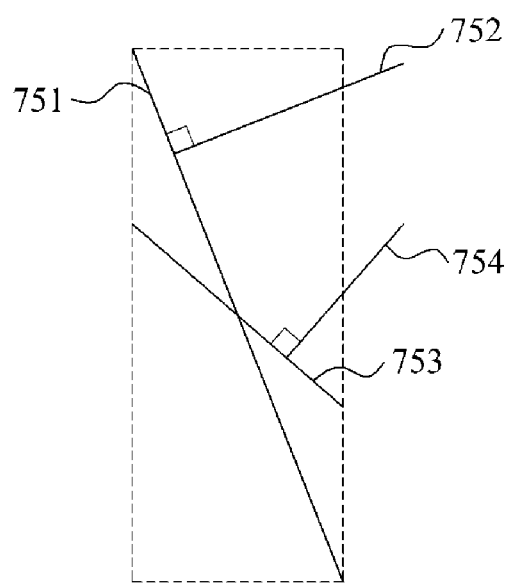

Referring to FIG. 7C, constellation points are distributed widely towards a direction of a Q coordinate axis when a state of a Q channel is relatively good, compared to an instance in which the state of the Q channel is relatively bad. An absolute value of a gradient of a line 751 when the state of the Q channel is relatively good is greater than an absolute value of a gradient of a line 753 when the state of the Q channel is relatively bad. A gradient of the projection line 752 when the state of the Q channel is relatively good is less than a gradient of a projection line 754 when the state of the Q channel is relatively bad. Accordingly, a gradient of a projection line is inversely proportional to the state of the Q channel.

Figure 7D:
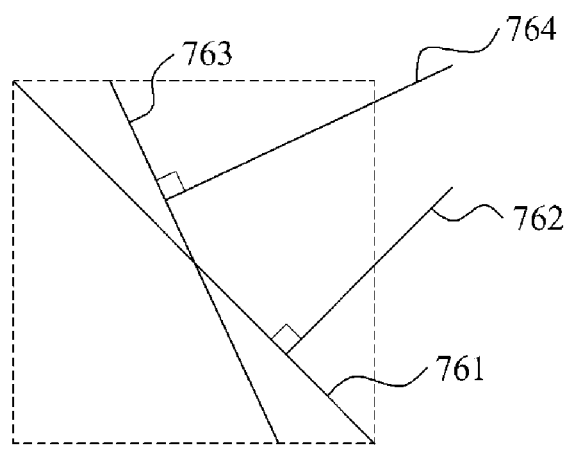

Referring to FIG. 7D, constellation points are distributed widely towards a direction of an I coordinate axis when a state of an I channel is relatively good, compared to an instance in which the state of the I channel is relatively bad. An absolute value of a gradient of a line 761 when the state of the I channel is relatively good is less than an absolute value of a gradient of a line 763 when the state of the I channel is relatively bad. A gradient of a projection line 762 when the state of the I channel is relatively good is greater than a gradient of a projection line 764 when the state of the I channel is relatively bad. Accordingly, a gradient of a projection line is proportional to the state of the I channel. Therefore, the gradient of the projection line 712 in the constellation 710 of the reception signal is shown as $$\frac{h_I \sin\alpha}{h_Q \cos\alpha}.$$

When the constellation 710 of the reception signal changes to the original rotated constellation 720 through channel equalization, a gradient of a reference line 722 is simplified to $$\frac{h_I^2 \sin\alpha}{h_Q^2 \cos\alpha}.$$

Channel equalization is performed by multiplying "$1/h_Q$" to the direction of the Q coordinate axis and multiplying "$1/h_I$" to the direction of the I coordinate axis because the state of the Q channel and the state of the I channel have a value between "0" and "1". Channel equalization is performed by multiplying a channel equalization rate "$1/h_I$" in the I coordinate axis direction to a denominator corresponding to an increased value towards the x axis. The channel equalization is also performed by multiplying a channel equalization rate "$1/h_Q$" in the Q coordinate axis to a numerator corresponding to an increased value towards the y axis direction because a gradient is represented by an increased value towards a y axis/increased value towards an x axis. Accordingly, the gradient of the reference line 722 in the original rotated constellation 720 is calculated to be $$\frac{h_I^2 \sin\alpha}{h_Q^2 \cos\alpha}.$$

When the original rotated constellation 720 changes to the original non-rotated constellation 730 through rotation angle compensation, the gradient of the reference line 732 is calculated to be $$\frac{(h_I^2 - h_Q^2)\sin\alpha\cos\alpha}{(h_Q\cos\alpha)^2 + (h_I\sin\alpha)^2}.$$

The gradient $$\frac{h_I^2 \sin\alpha}{h_Q^2 \cos\alpha}$$

of the reference line 722 is rotated in a reverse direction by a rotation angle "α" of a constellation through $$\frac{(h_I^2 - h_Q^2)\sin\alpha\cos\alpha}{(h_Q\cos\alpha)^2 + (h_I\sin\alpha)^2}.$$

A process of selecting an optimal candidate using the reference line 732 changed in the original non-rotated constellation 730, that is, an equalized constellation is as follows. The plurality of lines in the original non-rotated constellation 730 is represented by Equation 5 because the plurality of lines includes straight lines.

$$x = a_I(-3,-1,1,3 \text{ for } 16 \text{ QAM}) \quad \text{[Equation 5]}$$

In Equation 5, "$a_I$" denotes coordinates to determine a position of the plurality of lines. The reference line 732 crossing the reception signal 731 is expressed by Equation 6.

$$y = \frac{\beta_{IC}\beta_{IS} - \beta_{QC}\beta_{QS}}{\beta_{QC}^2 + \beta_{IS}^2} x + \left( r_Q - \frac{\beta_{IC}\beta_{IS} - \beta_{QC}\beta_{QS}}{\beta_{QC}^2 + \beta_{IS}^2} r_I \right) \quad \text{[Equation 6]}$$

In Equation 6, $\beta_{IC} = h_I \cos\alpha$, $\beta_{IS} = h_I \sin\alpha$, $\beta_{QC} = h_Q \cos\alpha$, and $\beta_{QS} = h_Q \sin\alpha$. Intersecting points at which the plurality of lines intersects the reference line are defined by Equation 7.

$$c_I^2 = a_I, \quad c_Q^2 = r_Q - (r_I - a_I)\frac{\beta_{IC}\beta_{IS} - \beta_{QC}\beta_{QS}}{\beta_{QC}^2 + \beta_{IS}^2} \quad \text{[Equation 7]}$$

Equation 7 is used to determine an optimal candidate for a plurality of lines for LLR calculation. Once a single intersecting point is calculated based on Equation 7, remaining intersecting points are easily calculated based on linearity because a plurality of constellation points is distributed at identical intervals in the original non-rotated constellation 730. For example, a y coordinate of an intersecting point 733 on a first line is calculated to be "−1.4" based on Equation 7. When the gradient of the reference line 732 is assumed to be "0.8", an intersecting point 734 on a second line is calculated to be "−1.4+2*0.8=0.2". An intersecting point 735 on a third line is calculated to be "0.2+1.6=1.8", and an intersecting point 736 on a fourth line is calculated to be "1.8+1.6=3.4". As a result, a soft demapper may be readily implemented.

FIG. 8A illustrates an example of a method of calculating a gradient of a reference line in a constellation for even-numbered bits, for example, $b_1$ and $b_3$, from among a plurality of bits included in a symbol, in accord with an embodiment. Hereinafter, an index, for example, "1" or "3", of even-numbered bits, for example, $b_1$ and $b_3$, from among a plurality of bits corresponds to an odd number. Also, an index, for example, "0" or "2", of odd-numbered bits, for example, $b_0$ and $b_2$, from among the plurality of bits corresponds to an even number.

Referring to FIG. 8A, both of a channel state and a rotation angle of a constellation are applied to a constellation 810 of a reception signal. The constellation 810 of the reception signal corresponds to the faded rotated 16 QAM constellation 230 of FIG. 2. The constellation 810 of the reception signal may change to an original non-rotated constellation 830. For example, the constellation 810 of the reception signal changes to an original rotated constellation 820 by being scaled using a state of an I channel and a state of a Q channel. The original rotated constellation 820 changes to the original non-rotated constellation 830 by being rotated using a rotation angle of a constellation.

Figure 8B:
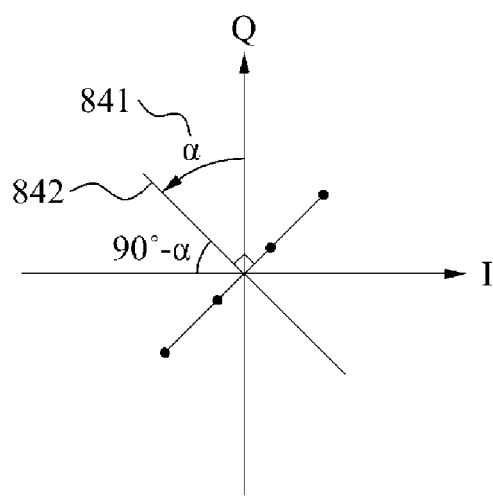

A gradient of a projection line in the constellation 810 of the reception signal is calculated to be $$-\frac{h_I \sin\left(\frac{\pi}{2} - \alpha\right)}{h_Q \cos\left(\frac{\pi}{2} - \alpha\right)}$$

because, as shown in FIG. 8B, in an absence of an occurrence of channel degradation, when a rotation angle of a constellation is "α" 841, a gradient of a projection line 842 is "−tan(π/2−α)". In this example, "α" denotes an angle obtained through a constellation being rotated, "$h_I$" denotes a state of an I channel, and "$h_Q$" denotes a state of a Q channel. The gradient $$-\frac{h_I \sin\left(\frac{\pi}{2} - \alpha\right)}{h_Q \cos\left(\frac{\pi}{2} - \alpha\right)}$$

of the projection line is simplified to $$-\frac{h_I \cos\alpha}{h_Q \sin\alpha}.$$

When the constellation 810 changes to the original rotated constellation 820 through channel equalization, a gradient of a reference line is calculated to be $$-\frac{h_I^2 \cos\alpha}{h_Q^2 \sin\alpha}.$$

When the original rotated constellation 820 changes to the original non-rotated constellation 830 through rotation angle compensation, the gradient of the reference line is calculated to be $$\frac{(h_Q\sin\alpha)^2 + (h_I\cos\alpha)^2}{(h_I^2 - h_Q^2)\sin\alpha\cos\alpha}.$$

Descriptions of FIG. 7A previously described may be applied to a method of inducing a gradient of a reference line and a method of selecting best candidates for a plurality of lines using a gradient of a reference line and; thus, repeated descriptions will be omitted for conciseness.

Figure 9:
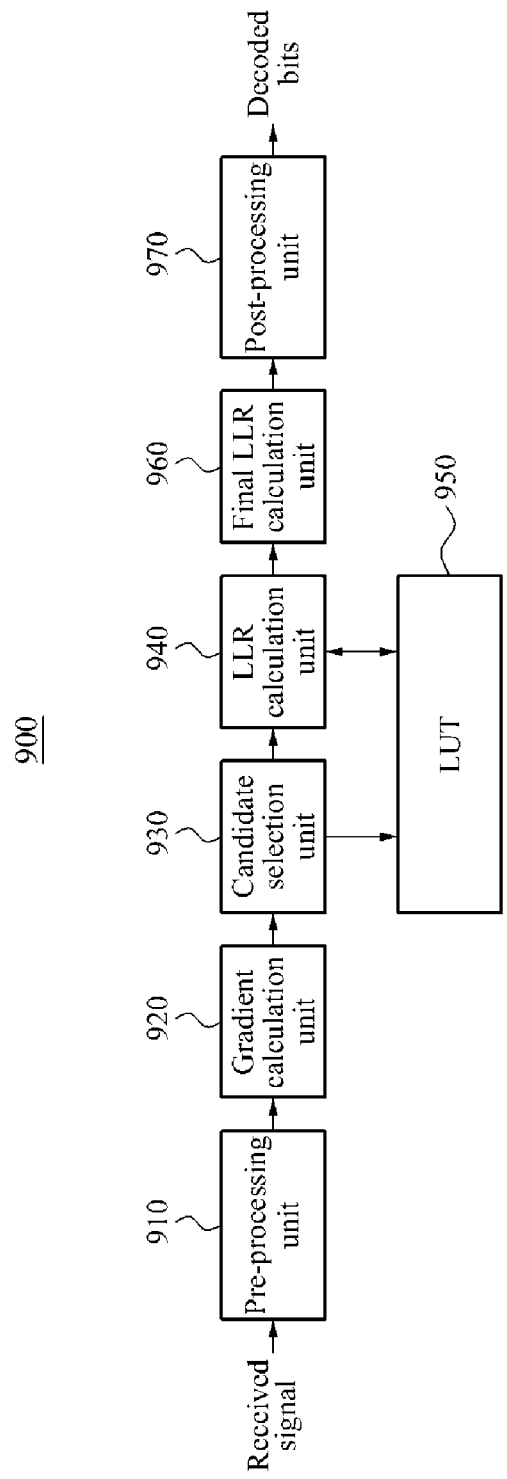
FIG. 9 is a block diagram illustrating an example of a soft demapping apparatus, in accord with an embodiment.

FIG. 9 illustrates an example of a soft demapping apparatus 900, in accordance with an embodiment.

Referring to FIG. 9, the soft demapping apparatus 900 includes a pre-processing unit 910, a gradient calculation unit 920, a candidate selection unit 930, an LLR calculation unit 940, a final LLR calculation unit 960, and a post-processing unit 970.

The pre-processing unit 910 obtains a reception signal from a transmitter of a symbol representing a plurality of bits. The symbol may refer to an M-QAM symbol, where "M"=$2^n$ and "n" is an integer greater than two.

The gradient calculation unit 920 calculates a gradient of a reference line in a constellation for a single bit based on a rotation angle of a constellation and a channel state. For example, the gradient calculation unit 920 calculates a gradient of a projection line disposed at right angles to a plurality of lines corresponding to a logic value of a single bit, in a constellation to which a rotation angle and a channel state are applied. The gradient calculation unit 920 scales the gradient of the projection line based on the channel state, and rotates the straight-lined gradient scaled based on the rotation angle. Alternatively, the gradient calculation unit 920 calculates a gradient of a reference line to be $$\frac{(h_I^2 - h_Q^2)\sin\alpha\cos\alpha}{(h_Q\cos\alpha)^2 + (h_I\sin\alpha)^2}$$

when a single bit belongs to a first group from among a plurality of bits. When a single bit belongs to a second group from among the plurality of bits, the gradient calculation unit 920 calculates the gradient of the reference line to be $$\frac{(h_Q\sin\alpha)^2 + (h_I\cos\alpha)^2}{(h_I^2 - h_Q^2)\sin\alpha\cos\alpha},$$

where "$h_I$" denotes a channel state of an I channel, "$h_Q$" denotes a channel state of a Q channel, and "$\alpha$" denotes a rotation angle of a constellation.

Based on a reception signal and a gradient of a reference line, the candidate selection unit 930 selects a single candidate for a plurality of lines corresponding to a logic value of a single bit from among a plurality of constellation points included in a constellation of the single bit. For example, the candidate selection unit 930 includes a coordinate calculation unit and a constellation point selection unit. The coordinate calculation unit is configured to calculate coordinates of intersecting points between a straight line crossing the reception signal and a plurality of lines based on the gradient of the reference line. The constellation point selection unit is configured to select a constellation point closest to an intersecting point of a corresponding line from among the plurality of constellation points included in the corresponding line for the plurality of lines.

The LLR calculation unit 940 calculates an LLR with respect to a single bit based on a reception signal and selected candidates. For example, the LLR calculation unit 940 calculates Euclidean distances between the reception signal and the selected candidates, and based on the Euclidean distances, calculates the LLR with respect to the single bit. Based on the reception signal and the selected candidates, in response to an index of a single bit being an even number from among a plurality of bits, the LLR calculation unit 940 calculates an LLR with respect to an alternative bit of which an index is an even number from among the plurality of bits. Based on the reception signal and the selected candidates, in response to an index of a single bit being an odd number in a plurality of bits, the LLR calculation unit 940 calculates an LLR with respect to an alternative bit of which an index is an odd number from among the plurality of bits.

The soft demapping apparatus 900 further includes an LUT 950. The LUT 950 stores the Euclidean distances between the reception signal and the selected candidates and indices of the selected candidates. The LLR calculation unit 940 calculates an LLR with respect to an alternative bit based on Euclidean distances and indices with respect to a predetermined bit stored in the LUT. The final LLR calculation unit 960 combines LLRs for a plurality of bits to detect the plurality of bits.

LLRs with respect to $\{b_0, b_2, \ldots b_{n-2}\}$ and $\{b_1, b_3, \ldots b_{n-1}\}$ are combined. Decoded bits are output based on the LLRs combined by the post-processing unit 970. Descriptions of FIGS. 1 through 8 provided in the preceding may be applied to each module shown in FIG. 9 and; thus, repeated descriptions will be omitted for conciseness.

Figure 10:
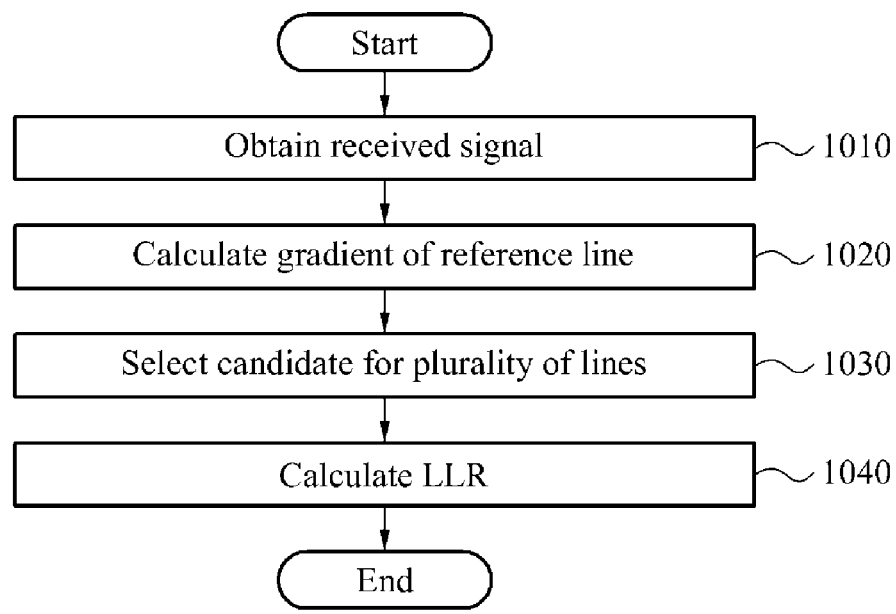
FIG. 10 is a flowchart illustrating an example of a soft demapping method, in accord with an embodiment.

FIG. 10 illustrates an example of a soft demapping method, in accord with an embodiment.

Referring to FIG. 10, at operation 1010, the soft demapping method includes obtaining or receiving a reception signal from a symbol transmitted from a transmitter. At operation 1020, the soft demapping method calculates a gradient of a reference line in a constellation for a single bit based on a rotation angle and a channel state of the constellation. At operation 1030, the soft demapping method selects, based on a reception signal and a gradient of a reference line, a single candidate for each of a plurality of lines corresponding to a logic value of a single bit from among a plurality of constellation points included in a constellation for the single bit. At operation 1040, the soft demapping method calculates, based on a reception signal and selected candidates, an LLR with respect to a single bit. Descriptions of FIGS. 1 through 9 provided in the preceding may be applied to each operation described in FIG. 10 and; thus, repeated descriptions will be omitted for conciseness.

The units described herein may be implemented using hardware components. For example, the hardware components may include processors, controllers, microphones, calculators, receivers, obtainers, transmitters, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIGS. 6 and 10 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 6 and 10.

Program instructions to perform a method described in FIGS. 6 and 10, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the embodiments disclosed herein may be easily construed by programmers skilled in the art to which the embodiments pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to perform a soft demapping, the method comprising:
  receiving a reception signal from a symbol representing bits;
  selecting two candidates from among constellation points in a constellation for each of the bits; and
  calculating a log-likelihood ratio (LLR) for each of the bits based on an Euclidean distance between the reception signal and the two candidates, wherein the calculating of the LLR comprises:
  storing, in a lookup table (LUT), the Euclidean distance between the reception signal and the two candidates and each index of the two candidates of a bit; and
  calculating the LLR of an alternative bit using the Euclidean distance between the reception signal and the two candidates and each index of the two candidates of the bit stored in the LUT.

2. The method of claim 1, further comprising:
  detecting the bits using the LLR for each of the bits.

3. The method of claim 1, wherein the selecting of the two candidates comprises:
  selecting one candidate in response to each of the bits being a first logic value, and selecting one alternative candidate in response to each of the bits being a second logic value.

4. The method of claim 1, wherein the selecting of the two candidates comprises:
  selecting a candidate, for each of lines corresponding to logic values of the bits, from among the constellation points included in the lines including a $\sqrt{M}$ number of constellation points in response to the symbol corresponding to an M-quadrature amplitude modulation (QAM) symbol, where "M"=$2^n$ and "n" is an integer greater than two.

5. The method of claim 4, wherein the constellation points in the lines correspond to a logic value of a corresponding bit.

6. The method of claim 1, further comprising:
  rotating, in a reverse direction, a constellation of the reception signal to provide the constellation as a vertical parallel or a horizontal parallel.

7. A non-transitory computer-readable storage medium comprising a program comprising instructions to cause a computer to perform the method of claim 1.

8. An apparatus to perform a soft demapping, the apparatus comprising:
  a pre-processing unit configured to pre-process a reception signal from a symbol representing bits;
  a candidate selection unit configured to select two candidates from among constellation points in a constellation for each of the bits;
  a log-likelihood ratio (LLR) calculation unit configured to calculate an LLR for each of the bits based on an Euclidean distance between the reception signal and the two candidates, and
  a lookup table (LUT) configured to store the Euclidean distance between the reception signal and the two candidates and each index of the two candidates of a bit, wherein the LLR calculation unit is configured to calculate the LLR of an alternative bit using the Euclidean distance between the reception signal and the two candidates and each index of the two candidates of the bit stored in the LUT.

9. The apparatus of claim 8, further comprising:
  a distance calculation unit configured to calculate the Euclidean distance between the reception signal and the two candidates.

10. The apparatus of claim 8, further comprising:
  a final LLR calculation unit configured to calculate a final LLR to detect the bits using the LLR for each of the bits.

11. The apparatus of claim 8, wherein the candidate selection unit is configured to select one candidate in response to each of the bits being a first logic value, and select one alternative candidate in response to each of the bits being a second logic value.

12. The apparatus of claim 8, wherein the candidate selection unit is configured to select a candidate, for each of lines corresponding to logic values of the bits, from among the constellation points included in the lines including a $\sqrt{M}$ number of constellation points in response to the symbol corresponding to an M-quadrature amplitude modulation (QAM) symbol, where "M"=$2^n$ and "n" is an integer greater than two.

13. The apparatus of claim 8, further comprising:
  a rotating unit configured to rotate, in a reverse direction, a constellation of the reception signal to provide the constellation as a vertical parallel or a horizontal parallel.

14. A method to perform a soft demapping, the method comprising:
  selecting, based on a reception signal, a candidate constellation point for each of lines of a plurality of lines, wherein the lines correspond to logical values of a bit from among bits included in a symbol used for data transmission and the lines are formed by constellation points in a constellation for the bit from among the bits; and calculating a log-likelihood ratio (LLR) of the bit based on the reception signal and the selected candidate constellation points, wherein a direction of the lines is determined based on whether the bit corresponds to an even-numbered bit or an odd-numbered bit.

15. The method of claim 14, wherein in response to the symbol corresponding to an M-quadrature amplitude modulation (QAM) symbol, a number of the selected candidate constellation points is $\sqrt{M}$, where "M"=$2^n$ and "n" is an integer greater than two.

16. The method of claim 14, wherein the symbol corresponds to a rotated QAM symbol to which a Q delay is applied, and the constellation for the bit corresponds to a constellation in which channel information of an I channel and channel information of a delayed Q channel are reflected.

17. The method of claim 14, wherein the calculating of the LLR of the bit comprises:
calculating distances between the reception signal and the selected candidate constellation points; and
calculating the LLR of the bit based on the calculated distances.

18. The method of claim 14, wherein the lines comprises:
a line corresponding to a first logic value of the bit, and a line corresponding to second logic value of the bit.

19. The method of claim 14, wherein in response to the symbol corresponding to the M-QAM symbol, each of the lines is formed by a $\sqrt{M}$ number of constellation points, where "M"=$2^n$ and "n" is an integer greater than two.

20. The method of claim 14, further comprising at least one of:
scaling constellation points of a faded constellation on an x axis direction corresponding to a degree of fading in an I channel in response to a Q delay being introduced to a rotated QAM; and
scaling constellation points of a faded constellation on a y axis direction corresponding to a degree of fading in a Q channel in response to the Q delay being introduced to the rotated QAM.

21. The method of claim 14, further comprising restoring an un-reception signal using a second of two signals in response to one of a real number portion signal and an imaginary number portion signal of a predetermined rotated QAM symbol not being received due to fading.

22. The method of claim 14, further comprising restoring an imaginary number portion of a rotated QAM symbol using a real number portion of the rotated QAM symbol in response to the imaginary number portion not being received due to fading.

23. A non-transitory computer-readable storage medium comprising a program comprising instructions to cause a computer to perform the method of claim 14.

24. A method to perform a soft demapping, the method comprising:
selecting from a reception signal a $\sqrt{M}$ number of candidate constellation points in a constellation for a bit from among bits included in an M-quadrature amplitude modulation (QAM) symbol, where "M"=$2^n$ and "n" is an integer greater than two; and
calculating a log-likelihood ratio (LLR) of the bit based on the reception signal and the selected candidate constellation points.

25. The method of claim 24, wherein the calculating of the LLR of the bit comprises:
calculating distances between the reception signal and the selected $\sqrt{M}$ number of candidate constellation points; and
calculating the LLR of the bit based on the calculated $\sqrt{M}$ number of distances.

26. The method of claim 24, wherein the symbol corresponds to a rotated QAM symbol to which a Q delay is applied, and the constellation for the bit corresponds to a constellation in which channel information of an I channel and channel information of a delayed Q channel are reflected.

27. A non-transitory computer-readable storage medium comprising a program comprising instructions to cause a computer to perform the method of claim 24.

28. An apparatus to perform a soft demapping, the apparatus comprising:
a selection unit configured to select from a reception signal a $\sqrt{M}$ number of candidate constellation points in a constellation for a bit from among bits included in an M-quadrature amplitude modulation (QAM) symbol, where "M"=$2^n$ and "n" is an integer greater than two; and
a calculation unit configured to calculate a log-likelihood ratio (LLR) of the bit based on the reception signal and the selected candidate constellation points.

29. An apparatus to perform a soft demapping, the apparatus comprising:
a selection unit configured to select, based on a reception signal, a candidate constellation point for each of lines of a plurality of lines, wherein the lines correspond to logical values of a bit from among bits included in a symbol used for data transmission and the lines are formed by constellation points in a constellation for the bit from among the bits, based on a reception signal; and
a calculation unit configured to calculate a log-likelihood ratio (LLR) of the bit based on the reception signal and the selected candidate constellation points, wherein a direction of the lines is determined based on whether the bit corresponds to an even-numbered bit or an odd-numbered bit.

30. The apparatus of claim 29, wherein in response to the bit being an even-numbered bit, the calculation unit is configured to calculate an LLR of an alternative even-numbered bit using the candidate constellation points selected of the bit, and
in response to the bit being an odd-numbered bit, the calculation unit is configured to calculate an LLR of an alternative odd-numbered bit using the candidate constellation points selected of the bit.

31. The apparatus of claim 29, wherein the calculation unit is configured to calculate distances between the reception signal and the selected candidate constellation points, and calculate the LLR of the bit based on the calculated distances.

32. The apparatus of claim 29, wherein in response to the symbol corresponding to an M-QAM symbol, where "M"=$2^n$ and "n" is an integer greater than two, a number of the selected candidate constellation points is $\sqrt{M}$.

33. The apparatus of claim 29, wherein the symbol corresponds to a rotated QAM symbol to which a Q delay is applied, and a constellation for the bit corresponds to a constellation in which channel information of an I channel and channel information of a delayed Q channel are reflected.

34. The apparatus of claim 29, further comprising:
a gradient calculation unit configured to calculate a gradient of a reference line in a constellation for a single bit based on a rotation angle of a constellation and a channel state.

35. The apparatus of claim 29, further comprising:
a final LLR calculation unit configured to calculate a final LLR using LLRs of the bits to detect the bits.

\* \* \* \* \*